United States Patent [19]  
Spencer

[11] Patent Number: 4,737,843  
[45] Date of Patent: Apr. 12, 1988

[54] COLOR IMAGE DISPLAY SYSTEM FOR PRODUCING AND COMBINING FOUR COLOR COMPONENT IMAGES EACH INVERTED IN AT LEAST ONE ASPECT RELATIVE TO THE OTHER IMAGES

[75] Inventor: Gordon R. Spencer, Westwood, Mass.

[73] Assignee: Raytheon Company, Lexington, Mass.

[21] Appl. No.: 947,294
[22] Filed: Dec. 29, 1986

Related U.S. Application Data

[63] Continuation of Ser. No. 598,031, Apr. 9, 1984, abandoned.

[51] Int. Cl.[4] .................. H04N 9/22; H04N 9/16; H04N 9/31; G03B 21/06
[52] U.S. Cl. .................. 358/66; 358/60; 358/64; 353/34
[58] Field of Search .......... 358/66, 49, 65, 64, 358/60; 352/67; 353/34

[56] References Cited

U.S. PATENT DOCUMENTS

| 2,083,203 | 6/1937 | Schlesinger | 358/60 |
|---|---|---|---|
| 2,200,285 | 5/1940 | Lorenzen | 358/66 |
| 2,337,980 | 12/1943 | Du Mont et al. | 358/66 |
| 2,552,464 | 5/1951 | Siezen | 358/66 |
| 2,586,558 | 2/1952 | Oakhill | 358/66 |
| 2,677,722 | 5/1954 | Bedford | 358/64 |
| 2,965,706 | 12/1960 | Ridgeway | 358/60 |
| 3,006,989 | 10/1961 | Schröter | 358/65 |
| 3,202,039 | 8/1965 | De Lang et al. | 358/55 |
| 3,280,254 | 10/1966 | Marez | 358/66 |
| 3,291,906 | 12/1966 | Ward et al. | 358/250 |
| 3,711,826 | 1/1973 | La Russa | 358/250 |
| 3,778,548 | 12/1973 | Nistri | 358/250 |
| 3,885,095 | 5/1975 | Wolfson et al. | 358/250 |
| 4,027,328 | 5/1977 | Lessman | 358/64 |
| 4,167,113 | 9/1979 | Mann | 358/250 |
| 4,249,205 | 2/1981 | Buchroeder | 358/60 |
| 4,301,468 | 11/1981 | Alvarez | 358/66 |
| 4,368,950 | 1/1983 | Sakamoto | 350/174 |
| 4,431,258 | 2/1984 | Fye | 350/174 |

FOREIGN PATENT DOCUMENTS

| 0039619 | 11/1981 | European Pat. Off. |  |
|---|---|---|---|
| 0056307 | 7/1982 | European Pat. Off. |  |
| 3305314 | 9/1983 | Fed. Rep. of Germany. |  |
| 551357 | 4/1923 | France. |  |
| 762225 | 4/1934 | France. |  |
| 967439 | 11/1950 | France. |  |
| 1417975 | 10/1965 | France | 358/66 |
| 160744 | 12/1981 | Japan. |  |
| 155361 | 9/1983 | Japan. |  |
| 424743 | 2/1935 | United Kingdom. |  |
| 562168 | 6/1944 | United Kingdom. |  |
| 696615 | 9/1953 | United Kingdom. |  |
| 735745 | 8/1955 | United Kingdom. |  |
| 856932 | 12/1960 | United Kingdom. |  |
| 1031327 | 6/1966 | United Kingdom. |  |
| 2014752 | 8/1979 | United Kingdom. |  |
| 2029667 | 3/1980 | United Kingdom. |  |
| 2066499 | 7/1981 | United Kingdom. |  |
| 2111712 | 6/1983 | United Kingdom. |  |
| 2118360 | 10/1983 | United Kingdom. |  |

Primary Examiner—James J. Groody  
Assistant Examiner—Randall S. Svihla  
Attorney, Agent, or Firm—Richard M. Sharkansky; John T. Meaney

[57] ABSTRACT

An image display system comprising a cathode ray type of tube having an electron gun disposed for directing an electron beam onto an output phosphor screen provided with quadrant portions extending from a common point and made of respective different phosphor materials; a beam directing assembly coupled to the electron beam for deflecting the beam over each of the quadrant portions sequentially in a manner inverted in at least one aspect relative to the deflection of the beam over the other quadrant portions and producing thereon a respective component image of a subject inverted in at least one aspect relative to the other component images; and an optical combiner assembly coupled to the output screen for combining the component images and producing a single composite image of the subject. The optical combiner assembly includes a beamsplitter disposed in alignment with one of the quadrant portions and oriented at an angle with respect thereto for directing first and second portions of an image received from the aligned quadrant portion along respective first and second paths to respective first and second reflectors, combining the resulting reflected portions received back from the first and second reflectors, and directing the combined portions along a third path to the output of the optical combiner assembly.

20 Claims, 7 Drawing Sheets

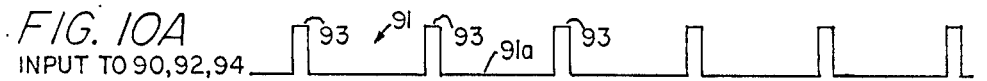
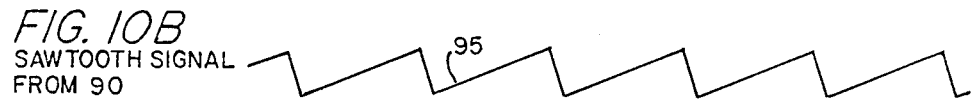
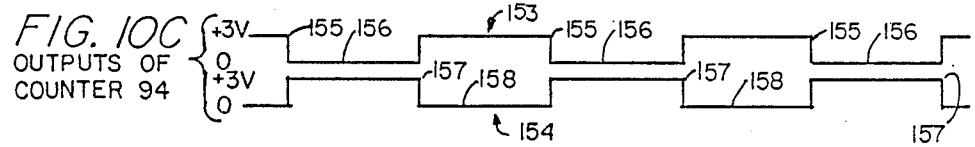
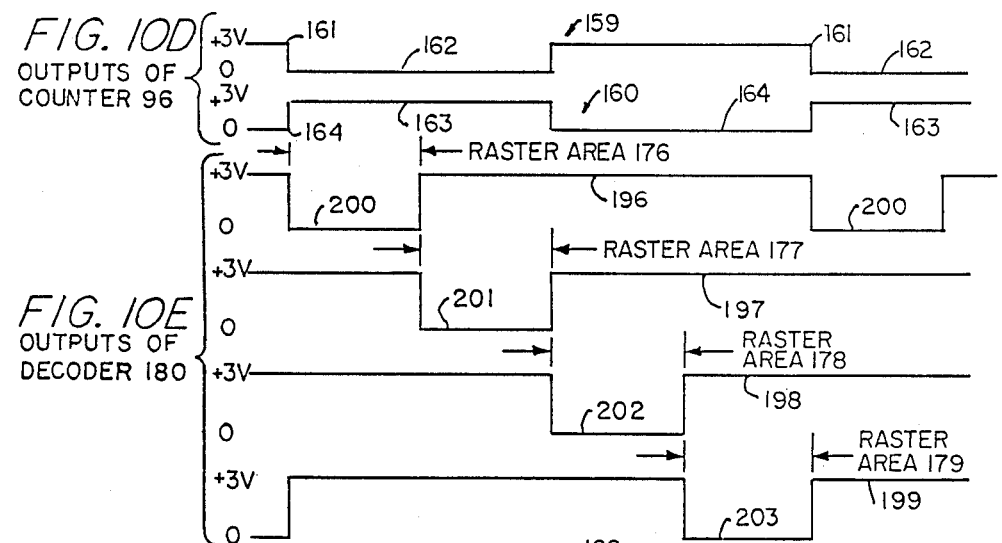
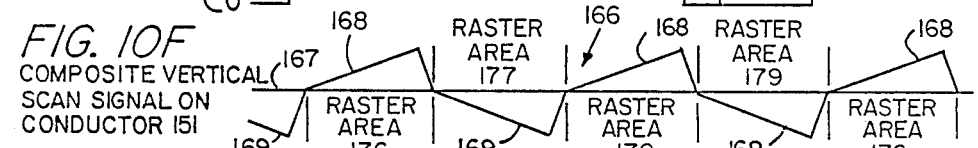
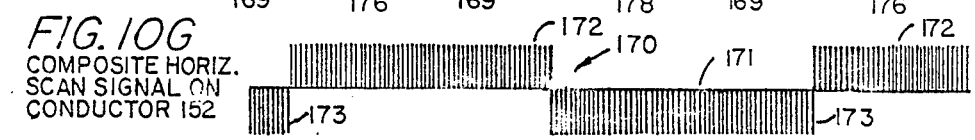
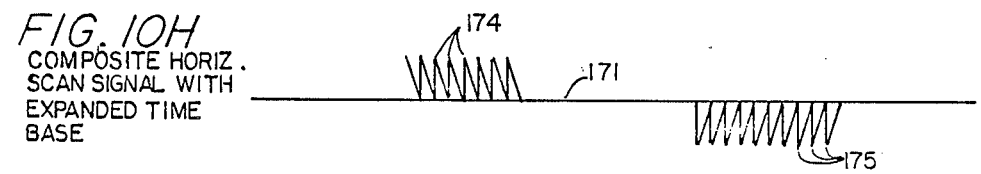

COLOR IMAGE DISPLAY SYSTEM FOR PRODUCING AND COMBINING FOUR COLOR COMPONENT IMAGES EACH INVERTED IN AT LEAST ONE ASPECT RELATIVE TO THE OTHER IMAGES

The application is a continuation of application Ser. No. 598,031 filed Apr. 9, 1984 now abanondoned.

CROSS-REFERENCE TO RELATED APPLICATIONS

Reference is hereby made to copending U. S. patent applications: Ser. No. 039,816, filed on Apr. 14, 1987, which is a continuation of Ser. No. 771,162, filed on Aug. 30, 1985, now abandoned, which in turn is a continuation of Ser. No. 350,469, filed on Feb. 19, 1982, now abandoned; Ser. No. 946,670, filed on Dec. 31, 1986, which is a continuation of Ser. No. 513,939, filed on July 15, 1983, now abandoned; and Ser. No. 557,981, filed on Dec. 5, 1983; and applicant claims the benefit of the filing dates of said applications as to claimed common subject matter.

BACKGROUND OF THE INVENTION

1. Field of the Invention

This invention relates generally to image display apparatus and is concerned more particularly with an imaging system for producing three or more color component images of a subject and combining the images to display a single multicolor image of said subject.

2. Discussion of the Prior Art

A cathode ray type of image display tube generally includes a tubular envelope having therein an electron gun disposed for directing an electron beam in scanning fashion over a portion of an output phosphor screen to produce a visible light image. The phosphor screen may be provided with a suitable phosphor material for emitting a desired color light when penetrated by electrons from the scanning beam. Thus, a plurality of cathode ray tubes may have respective phosphor screens comprised of different phosphor materials for producing respective different color component images of the same subject matter, and be disposed for projecting the different color images into superposition with one another on a projection screen. As a result, there will be displayed on the projection screen a single multi-color image having discrete areas colored in accordance with the relative intensities of the different colors in corresponding discrete areas of the respective component images produced by each of the cathode ray tubes However, it has been found difficult to provide a plurality of cathode ray tubes with means for producing identical images of the same subject matter, and to maintain the tubes in precise optical alignment so as to obtain color registration in discrete areas of the multicolor image. Consequently, there has been developed in the prior art various types of cathode ray tubes having phosphor screens provided with different phosphor materials for producing a multi-color image. A cathode ray tube of the shadow mask type, for example, has a phosphor screen provided with intermingled arrays of phosphor dots, the dots of each array comprising a different phosphor material for emitting a respective color light when penetrated by electrons from an associated beam passing through aligned apertures in a shadow mask. A cathode ray tube of the beam-indexing type, for another example, has a phosphor screen provided with intermingled arrays of phosphor stripes, the stripes of each array comprising a different phosphor material for localized emission of a respective color light when penetrated by electrons from a suitably indexed electron beam. A cathode ray tube of the voltage penetration type, for a third example, has a phosphor screen provided with superimposed layers of different phosphor materials, the material of each layer being activated for localized emission of a respective color light when penetrated by electrons of an associated energy level in a scanning electron beam.

Thus, cathode ray tubes of the described types have phosphor screens requiring complex deposition techniques or special phosphor materials during fabrication, which increases the cost of producing these prior art tubes.

SUMMARY OF THE INVENTION

Accordingly, these and other disadvantages of the prior art are overcome by this invention providing an image display system having means for producing a group of three or more images which are disposed in a surface and arranged similarly about a predetermined portion of the surface. The images may be positioned to extend similarly in respective different directions from said predetermined portion of the surface and may comprise respective component images of a subject. Each of the images is inverted in at least one aspect relative to other images of the group.

This image display system also includes means coupled to the group for combining said three or more images and forming a single combined image. Thus, when the three or more images comprise respective component images of a subject the resulting single combined image is a composite image of the subject. Also, when the three or more component images are in respective different colors, the resulting composite image comprises a multicolor image of said subject.

The means for producing said group of three or more images may include a cathode ray type of image display tube having a tubular envelope wherein an electron gun is disposed for directing an electron beam onto an output imaging screen aligned with an image transmissive portion of the envelope. The output imaging screen comprises quadrant portions of respective phosphor materials extended similarly from a central portion of the screen and suitable for emitting a desired color light locally in response to impinging electrons of the beam.

The means for producing said group of three or more images also may include beam control means coupled to the electron beam for deflecting the beam over each of said quadrant portions sequentially while varying the intensity of the beam accordingly to produce thereon the repective images. However, the electron beam is deflected over each of said quadrant portions, as by scanning a conventional raster pattern, for example, in a respective manner which is inverse in at least one aspect as compared to the manners in which the electron beam is deflected over the other quadrant portions. Consequently, the respective component images produced on the quadrant portions are inverted in at least one aspect when compared to one another.

The image combining means of this image display system may comprise an optical combiner assembly which is disposed externally of the tube envelope and optically coupled through said image transmissive portion thereof with the output imaging screen of the tube. The optical combiner assembly may include an array of optical devices aligned with one another and supported for receiving light from each of said quadrant portions of the output screen and for directing it along respective paths of equivalent optical length. As a result, corresponding light rays from said quadrant portions reach the observer's eye on identical light paths; and the respective images produced on said quadrant portions are made to appear superimposed on one another at a common virtual image surface. Also, the optical devices of the image combiner assembly are arranged such that the mutually inverted images on said quadrant portions are oriented similarly as seen in the common virtual image surface. Consequently, an observer's eye positioned beyond the output of the optical combiner assembly and looking along the optical axis thereof sees a single combined image. Accordingly, when respective component images of a subject are produced on the quadrant portions in respective different colors, the observer's eye sees a single multi-color composite image having in it not only the colors of the respective component images but also blends thereof forming intermediate perceived colors.

BRIEF DESCRIPTION OF THE DRAWINGS

For a more complete understanding of the invention, reference is made in the following detailed description to the accompanying drawings wherein:

FIGS. 10A–10H are diagrammatic views of waveforms representing electrical signals generated when using the circuitry shown in FIG. 9.

DESCRIPTION OF THE PREFERRED EMBODIMENTS

Figure 1:
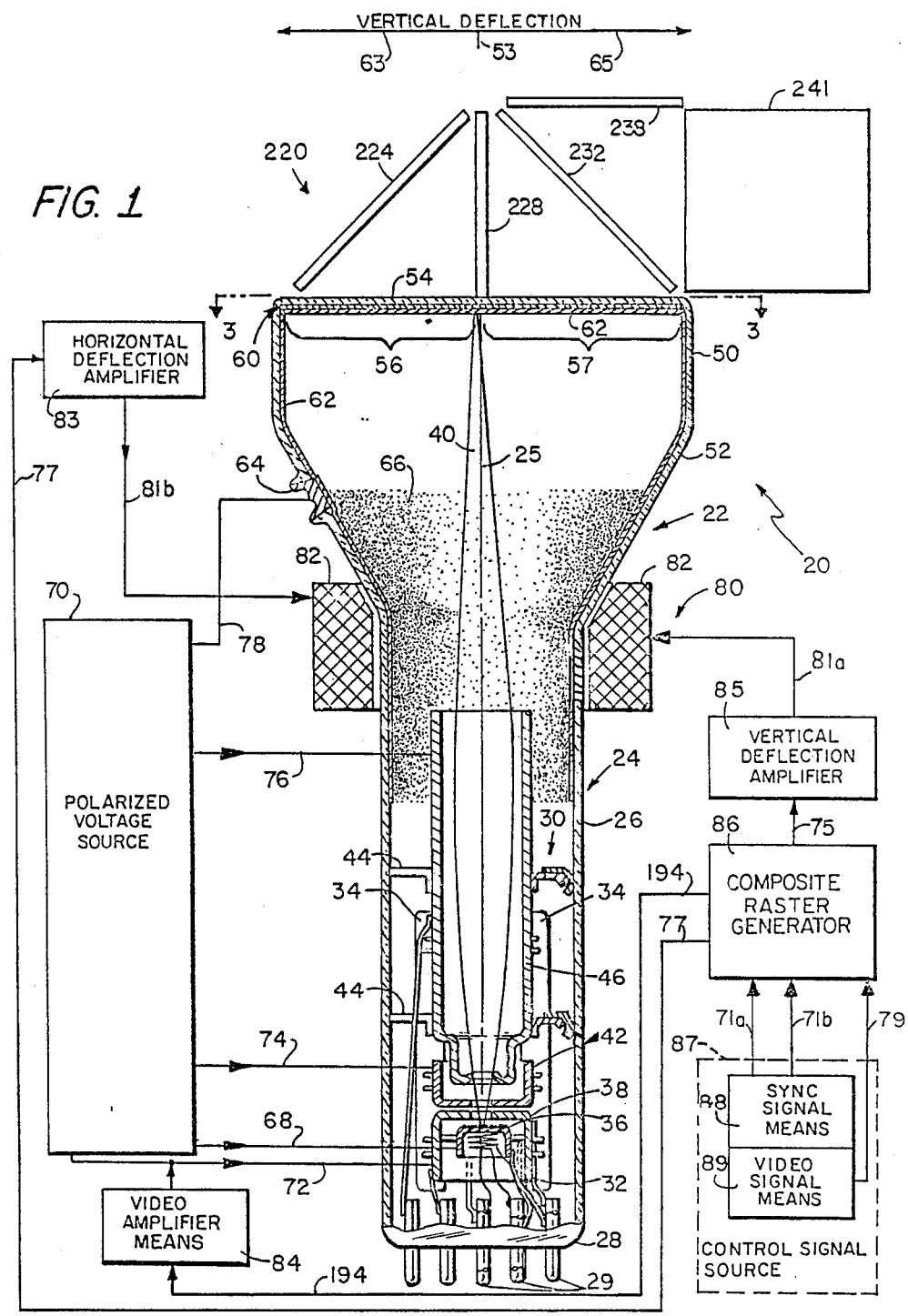
FIG. 1 is an axial sectional and schematic view of an image display system embodying the invention.

Referring to the drawings wherein like characters of reference designate like parts, there is shown in FIG. 1 a multi-color image display system 20 comprising a cathode ray type of tube 22. The tube 22 is provided with a funnel-shaped envelope 24 made of suitable dielectric material, such as glass, for example, and having an axial centerline 25 which extends into a neck-end portion 26 of the envelope 24. Neck-end portion 26 terminates at one end of envelope 24 in a peripherally sealed stem press 28 through which a circular array of spaced terminal pins 29 extends hermetically. The terminal pins 29 provide means for supporting and making electrical connections to respective elements of an electron gun 30 which is disposed axially within the neck-end portion 26 of envelope 24.

The electron gun 30 includes a filamentary heater 32 axially disposed adjacent the stem press 28 and within an inverted cathode cup 36 which has a closed end provided with an outer coating (not shown) of heat sensitive, electron emitting material. Cathode cup 36 is axially disposed in spaced relationship within an inverted first grid cup 38 which has a centrally apertured, closed end aligned with the adjacent closed end of cathode cup 36. The closed end of inverted first grid cup 38 is disposed in close spaced and aligned relationship with a centrally apertured, closed end of an upright second grid cup 42. Extending in spaced relationship within the opposing open end of second grid cup 42 is a centrally apertured, closed end of an elongated focussing cup 46.

The opposing open end of focussing cup 46 constitutes the exit end portion of gun 30 from which an electron beam 40 is directed axially toward the opposing end portion of envelope 24. The respective beam-forming electrodes 38, 42 and 46 of gun 30 are insulatingly attached to one another, as a sub-assembly, for example, by being fixedly secured to a plurality of axially extending dielectric rods 34 which are angularly spaced apart about the gun 30. Also, the sub-assembly of beam-forming electrodes 38, 42 and 46 may be held substantially on the axial centerline 25 by means of a plurality of axially spaced collars 44 which encircle electrodes of the gun 30 and press against the inner surface of neck-end portion 26.

The neck-end portion 26 is integrally joined to an opposing larger diameter end portion 50 of envelope 24 through an interposed outwardly flared portion 52 thereof. Larger diameter end portion 50 terminates in a peripherally sealed faceplate 54 which is substantially perpendicular to axial centerline 25 of tube 22 and is made of transparent material, such as glass, for example. Deposited by conventional means on the inner surface of faceplate 54 is an output imaging screen 60 comprising a layer of phosphor material which emits light locally when a spot-sized region of the material is penetrated by electrons of the beam 40.

Figure 2:
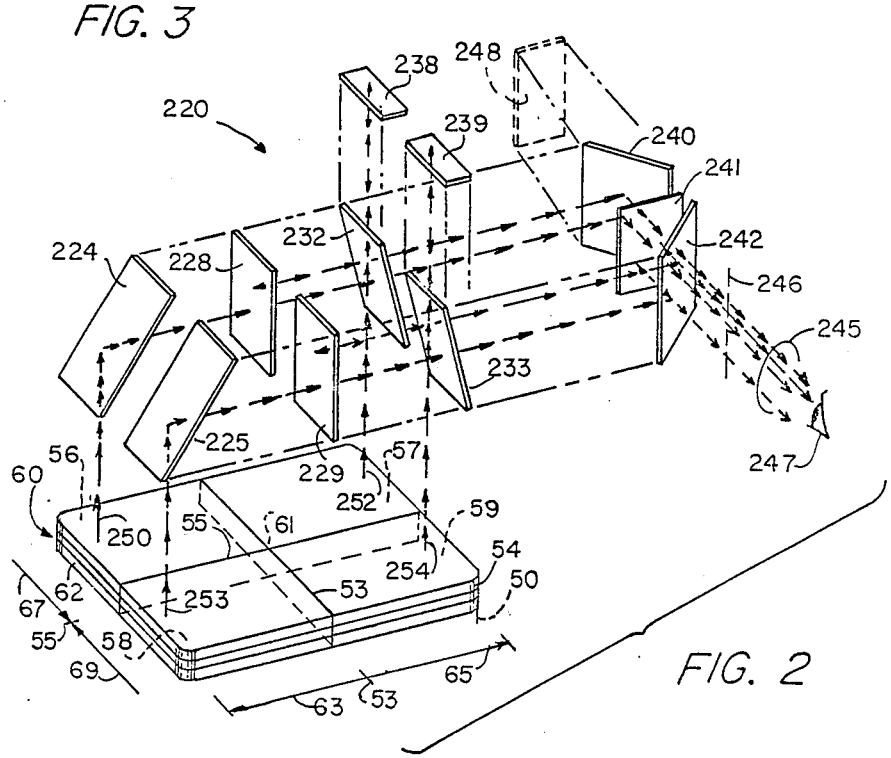
FIG. 2 is a schematic isometric view the optical combiner assembly at the output end of the image display tube shown in FIG. 1 but having the optical combiner assembly exploded for purposes of clarity.

As shown more clearly in FIG. 2, the phosphor layer of imaging screen 60 and the supporting faceplate 54 may be substantially coextensive with one another and have respective conforming rectangular configurations. Also, the phosphor layer of imaging screen 60 and the faceplate 54 may be regarded as quadrisected by two mutually orthogonal planes, 53 and 55, respectively, which extend substantially perpendicularly through the respective thicknesses of the phosphor layer and the faceplate. The mutually orthogonal planes 53 and 55 intersect one another at a central point or portion 61 of imaging screen 60 and define respective quadrant portions 56, 57, 58 and 59 of the phosphor layer. Thus, the quadrant portions 56, 57, 58 and 59 comprise respective corner portions of the rectangular phosphor layer 5 which, in comparison to one another, are of substantially equal areas and are grouped symmetrically about the central portion 61 of imaging screen 60.

The first quadrant portion 56 may be made of a suitable phosphor material, such as europium activated yttrium oxide, for example, which emits red color light locally in response to impinging electrons of the beam 40. Also, the second quadrant portion 57 may be made of a different phosphor material, such as maganese activated zinc silicate, for example, which emits green color light locally in response to incident electrons of the beam 40. Moreover, the third quadrant portion 58 may be made of still another phosphor material, such as silver activated zinc sulfide, for example, which emits a blue color light locally when a spot-sized region thereof is penetrated by electrons of the beam 40. Furthermore, the fourth quadrant portion 59 may be made of still another phosphor material, such as terbium activated yttrium oxysulfide, for example, which emits locally a blue color light of a longer wavelength band than that emitted by the phosphor material of quadrant portion 58 in response to impinging electrons of the beam 40.

Alternatively, the fourth quadrant portion 59 may be made of a suitable phosphor material having a persistence characteristic substantially different from those of the phosphor materials of the other three quadrants 56, 57 and 58, respectively. As another alternative, the fourth quadrant portion 59 of screen 60 may not be used at all since most colors perceived by the eye may be produced by combining the primary colors red, green, and blue emitted by the phosphor materials of quadrant portions 56, 57 and 58, respectively.

Disposed on the inner surface of imaging screen 60 is an anode coating 62 of electrically conductive material, such as aluminum, for example, which reflects visible light. The coating 62 extends not only over the entire inner surface of larger diameter end portion 50 but also extends axially as well as annularly into the flared portion 52 of the envelope 22. Anode coating 62 is electrically connected to an anode terminal button 64 extending hermetically through the wall of flared portion 52 for the purpose of making an electrical connection to the anode electrode of tube 22.

The anode terminal button 64 and the anode coating 62 are electrically connected to another anode coating 66 which extends from the button 64 toward the neck-end portion 26 of envelope 24. Coating 66 is made of suitable electrically conductive material, such as carbon, for example, which extends axially and annularly along the sloped inner surface of flared portion 52 and into the neck-end portion 26. Within neck-end portion 26, the anode coating 66 terminates in spaced encircling relationship with the exit end portion of gun 30 from which emerges the axially directed electron beam 40. Thus the respective anode coatings 66 and 62 form a generally inverted cup-shaped anode electrode which has established therein a substantially field-free space.

In operation, as shown schematically in FIG. 1, the cathode 36 of gun 30 may be electrically connected through a conductor 68 to a cathode voltage terminal of a polarized voltage source 70. The control grid electrode 38 of gun 30 may be connected electrically through a conductor 72 to a voltage terminal of source 70 which is electrically negative with respect to the cathode voltage terminal for the purpose of controlling the flow of electrons in the beam 40. The second grid electrode 42 of gun 30 may be connected electrically through a respective conductor 74 to an associated voltage terminal of source 70 which is more positive relative to the cathode voltage terminal; and the focussing electrode 46 of gun 30 may be connected electrically through a respective conductor 76 to an associated voltage terminal of source 70 which is still more positive with respect to the cathode voltage terminal of source 70. The anode terminal button 64 may be connected electrically through a conductor 78 to an anode voltage terminal of source 70 which is highly positive electrically with respect to the cathode voltage terminal of source 70. Thus, the respective beam forming electrodes 38, 42, 46 of gun 30 and the cup-shaped anode electrode of tube 22 are maintained at suitable electrical potentials relative to the potential of cathode 36 to focus the electrons of beam 40 onto a small spot area of imaging screen 60 for producing a localized emission of visible light from a penetrated spot-sized region of phosphor material in any of the respective quadrant portions 56, 57, 58 and 59 of the screen 60.

A beam directing assembly 80 includes beam coupling means comprising an electromagnetic yoke 82 which encircles the outer surface of neck-end portion 26, adjacent the flared portion 52 of envelope 24, such that the electron beam 40 exiting from gun 30 passes through yoke 82. The yoke 82 comprises an electromagnetic beam deflection means including an opposing pair of interconnected vertical deflection coils (not shown) which are energized for deflecting the electron beam 40 in opposing vertical directions away from the plane 53 (FIG. 2), as denoted by collinear vertical vectors 63 and 65, respectively. The vertical deflection coils of yoke 82 are electrically connected through a conductor 81a to a conventional vertical deflection amplifier 85 which receives signals through a conductor 75 from a composite raster generator 86. Composite raster generator 86 receives drive signals through respective conductors 71a and 71b from a conventional sync signal means 88 comprising one component of a control signal source 87.

Yoke 82 also includes an opposing pair of interconnected horizontal deflection coils (not shown) which are energized for deflecting the electron beam 40 from opposing horizontal directions toward plane 55 (FIG. 2), as denoted by collinear horizontal vectors 67 and 69, respectively, each of which is substantially perpendicular to the respective vertical vector lines 63 and 65. The horizontal deflection coils of yoke 82 are electrically connected through a conductor 81b to a conventional horizontal deflection amplifier 83 which receives signals through a conductor 77 from the composite raster generator 86. The composite raster generator 86 also receives signals through an electrical conductor 79 from a conventional video signal means 89 which comprises another component of control signal source 87. The composite raster generator 86 feeds output signals through an electrical conductor 194 to a video amplifier means 84, which is connected to send corresponding signals through the conductor 72 to the control grid electrode 38 of tube 22.

Figure 9:
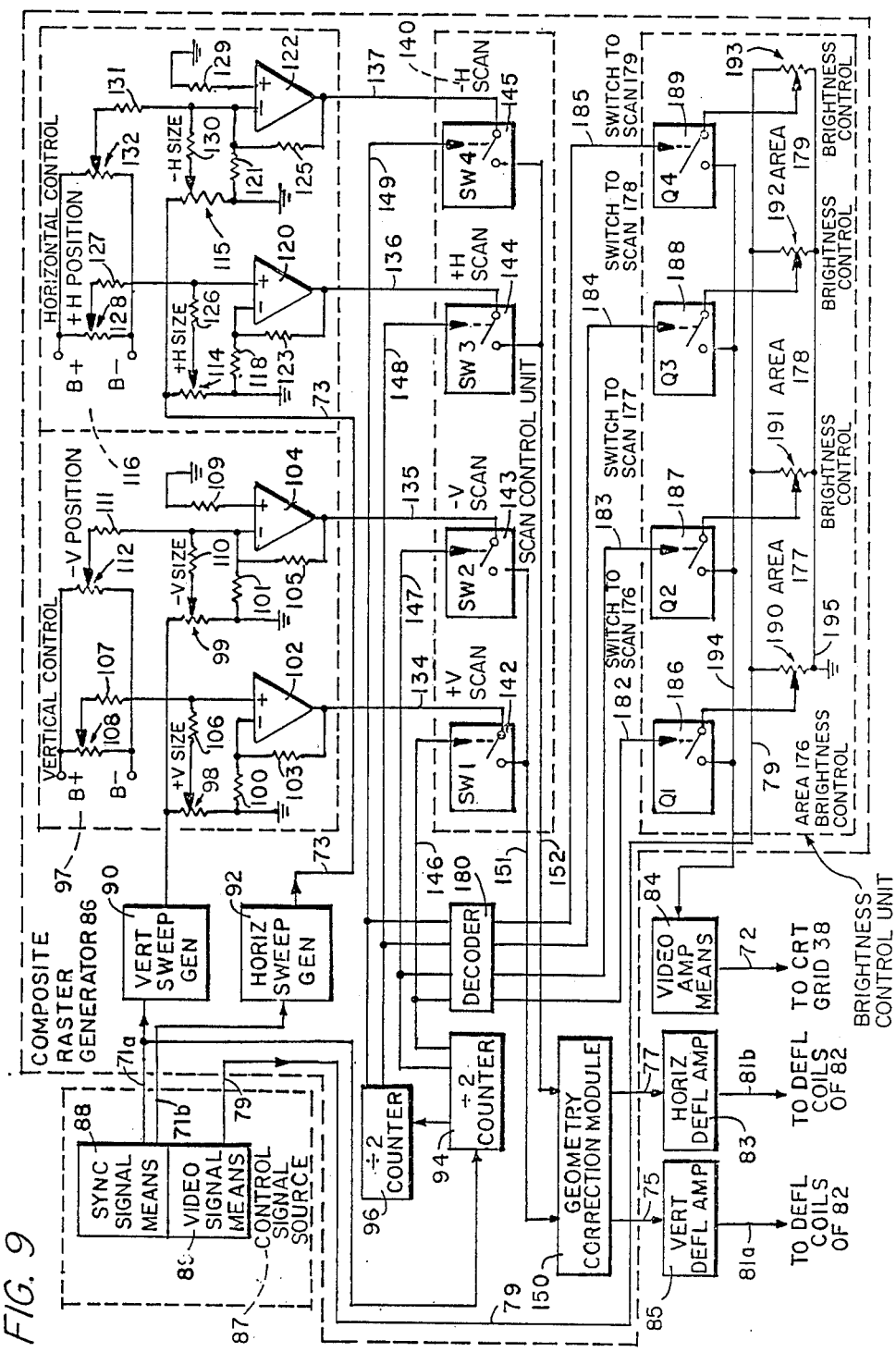
FIG. 9 is an electrical schematic view of circuitry which may be embodied in the composite raster generator shown in FIG. 1.

As shown in FIG. 9, within the composite raster generator 86 the output of sync signal means 88 is connected electrically through conductors 71a and 71b to input terminals of conventional vertical and horizontal sweep generators, 90 and 92, respectively. Also, the conductor 71a is connected to an input terminal of a divide-by-two counter 94 which has a drive output terminal connected to an input terminal of another divide-by-two counter 96. As a result, there is applied to the input of generator 90 as well as to the input of counter 94 a clock-like drive signal. As shown in FIG. 10A, the drive signal from sync signal means 88 may be represented by a waveform 91 having substantially uniform clock pulses 93 extending in the positive direction from a time-related baseline 91a and regularly spaced apart, that is occurring in substantially equal periods of time. The repetition rate or frequency of the clock pulses 93 is substantially equal to the desired vertical scan rate for each of the respective quadrant portions 56, 57, 58 and 59 of imaging screen 60.

Vertical sweep generator 90 applies to its output terminal a vertical scan voltage signal which, as shown in FIG. 10B, may be represented by a positive sawtooth waveform 95 having a period substantially equal to that of the waveform 91 shown in FIG. 10A. The output of vertical sweep generator 90 is connected to electrical ground through two parallel resistive elements of respective potentiometers 98 and 99 in a vertical control unit 97. The potentiometers 98 and 99 control the vertical size of areas scanned by electron beam 40 on the quadrant portions 56, 57, 58 and 59, respectively, of imaging screen 60. Potentiometer 98 has the grounded end of its resistive element connected through a resistor 100 to an inverting (−) input terminal of an amplifier 102 which is connected through another resistor 103 to the output of amplifier 102. Similarly, potentiometer 99 has the grounded end of its resistive element connected through a resistor 101 to an inverting (−) input terminal of an amplifier 104 which is connected through another resistor 105 to the output of amplifier 104.

Amplifier 102 has its non-inverting (+) input terminal connected through a resistor 106 to the wiper arm of vertical size control potentiometer 98 and through a resistor 107 to a wiper arm of a vertical position control potentiometer 108. However, unlike the amplifier 102, amplifier 104 has its non-inverting (+) input terminal connected through a resistor 109 to electrical ground. The inverting (−) input terminal of amplifier 104 is connected through a resistor 110 to the wiper arm of vertical size control potentiometer 99 and through a resistor 111 to the wiper arm of a vertical position control potentiometer 112. The same value of polarized voltage (b+,B−) may. be applied across the resistive elements of vertical position control potentiometers 108 and 112, respectively, or different values of polarized voltages may be applied across each of the resistive elements, as desired. The potentiometers 108 and 112 provide means for vertically positioning the color images produced on the respective quadrant portions 56, 57, 58 and 59 of imaging screen 60 so that they may be optically superimposed on one another to display a single multi-color image.

Thus, the amplifier 102 is connected for producing at its output terminal a vertical scan voltage signal having the same polarity as the combined voltage input signals received at its non-inverting (+) input terminal from the vertical size control potentiometer 98 and the vertical position control potentiometer 108. On the other hand, the amplifier 104 is connected for producing at its output terminal a vertical scan voltage signal having the inverse polarity of the combined input signals received at its inverting (−) input terminal from the vertical size control potentiometer 99 and the vertical position control potentiometers 112. The amplifiers 102 and 104 may be of the solid state dual operational type, such as OP AMP MC 1747 sold by Motorola Semiconductor Products of Pheonix, Ariz., for example.

Horizontal sweep generator 92 applies to its output terminal a horizontal scan voltage signal which, as shown in FIG. 10H, may be represented by sawtooth waveforms 174 and 175, respectively, each of which has a period suitable for scanning once across any one of the respective quadrant portions 56, 57, 58 and 59 of imaging screen 60. The output of horizontal sweep generator 92 is connected to a conductor 73 which is connected to electrical ground through two parallel resistive elements of respective potentiometers 114 and 115 in a horizontal control unit 116. The potentiometers 114 and 115 control the horizontal size of areas scanned by electron beam 40 on the quadrant portions 56, 57, 58 and 59, respectively, of imaging screen 60. Potentiometer 114 has the grounded end of its resistive element connected through a resistor 118 to an inverting (−) input terminal of an amplifier 120 which is connected through another resistor 123 to the output of amplifier 120. Similarly potentiometer 115 has the grounded end of its resistive element connected through a resistor 121 to an inverting (−) input terminal of an amplifier 122 which is connected through another resistor 125 to the output of amplifier 122.

Amplifier 120 has its non-inverting (+) input terminal connected through a resistor 126 to the wiper arm of horizontal size control potentiometer 114 and through a resistor 127 to a wiper arm of a horizontal position control potentiometer 128. However, unlike the amplifier 120, amplifier 122 has its non-inverting (+) input terminal connected through a resistor 129 to electrical ground. The inverting (−) input terminal of amplifier 122 is connected through a resistor 130 to the wiper arm of horizontal size control potentiometer 115 and through a resistor 131 to the wiper arm of a horizontal position control potentiometer 132. The same value of polarized voltage (B+,B−) may be applied across the resistive elements of horizontal position control potentiometers 128 and 132, respectively, or different values of polarized voltages may be applied across each of the resistive elements, as desired. The potentiometers 128 and 132 provide means for horizontally positioning images produced on the respective quadrant portions 56, 57, 58 and 59 of imaging screen 60 so that they may be optically superimposed on one another to display a single multi-color image.

Thus, the amplifier 120 is connected for producing at its output terminal a horizontal scan voltage signal having the same polarity as the combined voltage input signals received at its non-inverting (+) input terminal from the horizontal size control potentiometer 114 and the horizontal position control potentiometer 128. On the other hand, the amplifier 122 is connected for producing at its output terminal a horizontal scan voltage signal having the inverse polarity of the combined input signals received at its inverting (−) input terminal from the horizontal size control potentiometer 115 and the horizontal position control potentiometer 132. The amplifiers 120 and 122 also may be of the solid-state dual operational type, such as OP AMP MC 1747 sold by Motorola Semiconductor Products of Phoenix, Ariz., for example.

The non-inverting amplifier 102 and the inverting amplifier 104 in vertical control unit 97 have their output terminals connected through respective conductors 134 and 135 to movable arm contact elements of vertical scan switch devices, 142 and 143, respectively, in a switching unit 140. Also, the non-inverting amplifier 120 and the inverting amplifier 122 in horizontal control unit 116 have their output terminals connected through respective conductors 136 and 137 to moveable arm contact elements of horizontal scan switch devices, 144 and 145, respectively, in the switching unit 140. The vertical scan switch devices 142 and 143 have their switch actuating elements connected through respective conductors 146 and 147 to respective output terminals of the divide-by-two counter 94 which is driven by the clock-like signal from sync signal means 88. Moreover, the horizontal scan switch devices 144 and 145 have their switch actuating elements connected through respective conductors 148 and 149 to respective output terminals of the other divide-by-two counter 96 which is driven by output signals from the counter 94. The switch devices 142 and 143 have their stationary contact elements connected, in common, to a vertical scan output conductor 151. Furthermore, the switch devices 144 and 145 have their stationary contact elements connected, in common, to a horizontal scan output conductor 152.

Accordingly, the counter 94 applies to the output conductors 146 and 147 respective voltage signals which, as shown in FIG. 10C, may be represented by respective square waveforms 153 and 154. Each of the waveforms 153 and 154 has regularly occurring positive voltage pulses, 155 and 157, respectively, which are separated by zero voltage intervals, 156 and 158, respectively. Also, each of the waveforms 153 and 154 has a respective period which is substantially equal to the period of clock signal waveform 91 shown in FIG. 10A. However, unlike the clock pulses 93 of waveform 91, each of the positive voltage pulses 155 and 157 as well as each of the interposed zero voltage intervals, 156 and 158, respectively, has a length or duration which is substantially equal to an entire period. Also, when a clock pulse 93 occurs in the waveform 91 and a corresponding positive voltage pulse 157 occurs in the waveform 154, a zero voltage interval 156 of one period duration occurs in the waveform 153. Conversely, when a succeeding clock pulse 93 occurs in the waveform 91 and a corresponding positive voltage pulse 155 occurs in the waveform 153, a zero voltage interval 158 of one period duration occurs in the waveform 154.

Accordingly, when the counter 94 receives a clock voltage pulse from the sync signal means 88, the counter 94 removes a corresponding energizing voltage signal from one of its output conductors, such as 146, for example, and applies it to the other output conductor 147. At the completion of a period, the counter 94 receives a succeeding clock voltage pulse from the sync signal means 88 and transfers the corresponding energizing voltage signal from output conductor 147 back to the output conductor 146. As a result of receiving from sync signal means 88 a continuous train of clock voltage pulses spaced one period apart, the counter 94 alternately applies the corresponding energizing voltage signal in respective pulses of one period duration to each of its respective output conductors 146 and 147 sequentially and repetively.

Thus, when the counter 94 applies an energizing voltage pulse to the conductor 147, for example, the connected actuating element of switch device 143 is energized to hold the movable arm contact element thereof out of electrical engagement with the stationary contact element of the switch device 143. As a result, the output of vertical inverting amplifier 104 is disconnected from the vertical scan output conductor 151. Simultaneously, the counter 94 removes the energizing voltage pulse from the output conductor 146 whereby the connected actuating element of switch device 142 is de-energized. Consequently, the movable arm contact element of switch device 142 is allowed to move into electrical engagement with the stationary contact element thereof and connect the output of vertical non-inverting amplifier 102 to the vertical scan output conductor 151. Accordingly, the amplified vertical scanning voltage produced by non-inverting amplifier 102 is fed through the conductor 151 for the duration of one period.

At the completion of the period, when the counter 94 removes the energizing voltage signal from output conductor 147 and applies it to output conductor 146, the actuating element of switch device 142 is energized to hold the movable arm contact element thereof out of electrical engagement with the stationary contact element of the device. As a result, the output of vertical non-inverting amplifier 102 is disconnected from the vertical scan output conductor 151. Simultaneously, the actuating element of switch device 143 is de-energized and allows the movable arm contact element of the switch device 143 to move into electrical engagement with the stationary contact element thereof. Consequently, the output of vertical inverting amplifier 104 is connected to the vertical scan output conductor 151. Accordingly, the inverted vertical scanning voltage produced by amplifier 104 is fed through the vertical scan output conductor 151.

Thus, the counter 94 is driven by the clock voltage signal received from sync signal means 88 to apply the corresponding energizing voltage signal alternately to the output conductors 146 and 147, respectively. As a result, the vertical switch devices 142 and 143 are de-energized every other period to connect the outputs of respective amplifier 102 and 104 alternately to the vertical scan output conductor 151. Consequently, there is fed through the conductor 151 a composite vertical scanning voltage signal which, as shown in FIG. 10F, may be represented by a waveform 166 having a time-related baseline 167 from which extends alternate non-inverted and inverted vertical scanning voltage pulses, 168 and 169, respectively. The non-inverted vertical scan voltage pulses 168 increase progressively from baseline 167 to a positive peak and then decrease sharply back to the baseline 167. On the other hand, the inverted vertical scan voltage pulses 169 decrease progressively from baseline 167 to a negative peak and then increase sharply back to the baseline 167.

The counter 96 driven by output pulses from the counter 94 applies to its output conductors 148 and 149 respective voltage signals which, as shown in FIG. 10D, may be represented by respective waveforms 159 and 160 having regularly occurring, positive voltage pulses, 161 and 163, respectively, which are separated by zero voltage intervals, 162 and 164, respectively. Each of the waveforms 159 and 160 has a respective period which is substantially equal to twice the respective periods of waveform 91 shown in FIG. 10A and of waveforms 153 and 154 shown in FIG. 10C. Also, each of the pulses 162 and 164 has a length or duration which is substantially equal to an entire period of the associated waveforms 159 and 160, respectively. Moreover, when a positive voltage pulse 163 occurs in the waveform 160, a zero voltage interval 162 of one period duration occurs in the waveform 159; and when a succeeding positive voltage pulse 161 occurs in the waveform 159, a succeeding zero voltage interval 164 of period duration occurs in the waveform 160.

Accordingly, when the counter 96 receives two successive pulses from the counter 94, it removes an energizing voltage signal from one of its output conductors, such as 148, for example, and applies the energizing voltage signal to the other output conductor 149. As a result, the actuating element of horizontal switch device 145 is energized to hold the movable arm contact element thereof out of electrical engagement with the stationary contact element of the device. Thus, the output of inverting amplifier 122 in horizontal control unit 116 is disconnected from horizontal scan output conductor 152. Simultaneously, the actuating element of horizontal switch device 144 is de-energized thereby permitting the movable arm contact element to move into electrical engagement with the stationary contact element of the device. Consequently, the output of non-inverting amplifier 120 in horizontal control unit 116 is connected to the horizontal scan output conductor 152 for a double length period.

After the counter 96 receives two more sucessive pulses from the counter 94, the counter 96 removes the energizing voltage signal from output conductor 149 and transfers it to the output conductor 148. As a result, the actuating element of horizontal switch device 144 is energized to hold the moveable arm contact element thereof out of electrical engagement with the stationary contact element of the device. Thus, the output of non-inverting amplifier 120 in horizontal control unit 116 is disconnected from horizontal scan output conductor 152. Simultaneously, the actuating element of horizonal switch device 145 is de-energized thereby permitting the movable arm contact element to move into electrical engagement with the stationary contact element of the device. Consequently, the output of inverting amplifier 122 in horizontal control unit 116 is connected to the horizontal scan output conductor 152 for a double length period.

Accordingly, the counter 96 is driven by a train of pulses from the counter 94 to apply a corresponding energizing voltage signal alternately to its output conductors 148 and 149 for respective double length periods. As a result, the horizontal switch devices 144 and 145 are alternately actuated to connect the non-inverting amplifier 120 and the inverting amplifier 122 sequentially to the output conductor 152 for repetitive double length periods. Consequently, there is applied to the output conductor 152 a horizontal scanning signal which, as shown in FIG. 10G, may be represented by a composite horizontal scan waveform 170 having a time-related baseline 171 from which extends alternate positive and negative envelopes, 172 and 173, respectively. A comparison of the composite horizontal scan waveform 170 in FIG. 10G with the composite vertical scan waveform 166 in FIG. 10F indicates that the positive envelope 172 of waveform 170 is coextensive with successive non-inverted and inverted pulses, 168 and 169, respectively, of the waveform 166. Also, the succeeding negative envelope 173 of waveform 170 is coextensive with successive non-inverted and inverted pulses, 168 and 169, respectively, of the waveform 166. In FIG. 10H, it may be seen by expanding the time-related baseline 171 of waveform 170 shown in FIG. 10G, that each of the positive envelopes 172 comprises a succession of positive sawtooth pulses 174 having a period suitable for scanning once across any one of the respective quadrants 56, 57, 58 and 59 of imaging screen 60. Also, each of the negative envelopes 173 comprises a succession of negative sawtooth pulses 175 having an inverse polarity with respect to the positive sawtooth pulses 174 and a period which is suitable for scanning once across any one of the respective quadrants 56, 57, 58 and 59 of imaging screen 60.

Referring again to FIG. 9, the scan signal carrying conductors 151 and 152 are connected to respective input terminals of a geometry correction module 150. Since output screen 60 is disposed, on the substantially flat inner surface of output faceplate 54 and is scanned by the electron beam 40 being deflected electromagnetically, it may be necessary to incorporate into the scan signals carried by conductors 151 and 152, respective corrections for scan non-linearity and distortions in raster patterns scanned on the respective quadrant portions 56, 57, 58 and 59. The geometry correction module 150 may be of the type, such as INTRONICS C104 sold by Intronics of Newton, Mass., for example, used for smoothly synthesizing a correction function which closely approximates an exact mathematical correction function. Thus, the geometry correction module 150 comprises a linearity compensating means for eliminating any pincushion distortion, or the like, which may occur non-uniformly from image-to-image in the images produced sequentially on the respective quadrant portions of imaging screen 60. The geometry correction module 150 has respective output terminals connected through respective conductors 75 and 77 to vertical and horizontal deflection amplifiers, 85 and 83, respectively. The vertical deflection amplifier 85 is connected through a conductor 81a to the vertical deflection coils of yoke 82; and the horizontal deflection amplifier 83 is connected through a conductor 81b to the horizontal deflection coils of yoke 82.

Figure 3:
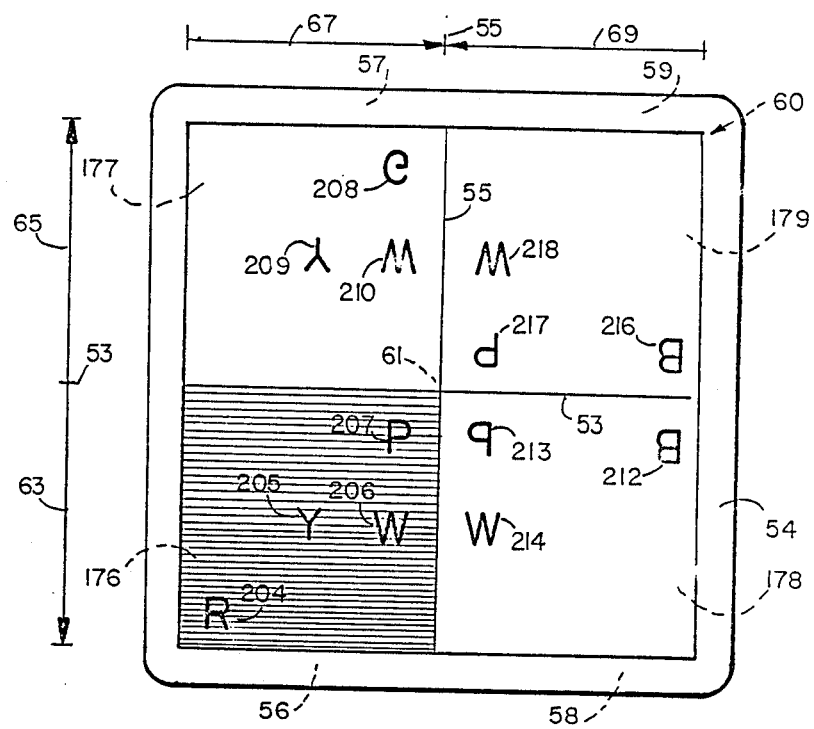
FIG. 3 is a plan view of the output end of the image display tube shown in FIG. 1 as taken along the line 3—3 and looking in the direction of the arrows, but rotated ninety degrees for purposes of clarity.

Accordingly, the vertical and horizontal scan signals applied to the respective vertical and horizontal deflection ( coils of yoke 82 cause the electron beam 40 to be deflected electromagnetically for scanning, as in line-by-line fashion, for example, over predetermined areas of the respective quadrant portions 56, 57, 58 and 59 sequentially. Consequently, as shown in FIG. 3, there may be produced on the quadrant portions 56, 57, 58 and 59 of imaging screen 60 respective illuminated raster areas 176, 177, 178 and 179, each of which is defined by the distinctive color light emitted locally from electron penetrated spot-sized regions of the associated phosphor material. Thus, red light is emitted from the raster area 176; green light is emitted from the raster area 177; and blue light of relatively shorter and longer wavelength bands, respectively, is emitted from the raster areas 178 and 179. The persistence of light emitted from the respective phosphor materials and the refresh rate of the deflected electron beam 40 relative to the persistence of vision aid in ensuring that the raster areas 176–179 are maintained simultaneously visible on the respective quadrant portions 56–59 of imaging screen 60.

Moreover, in order to produce symmetrical component images of the same subject on the respective quadrant portions 56–59, the vertical and horizontal scan signals cause the electron beam 40 to be deflected in a predetermined fashion for scanning each of the raster areas 176–179 in a respective different manner. As shown in FIG. 10F, the composite vertical scan waveform 166 includes a first full sawtooth pulse 168 extending in the positive direction from the baseline 167 of waveform 166 where the electron beam 40 may be considered as being at the plane 53 shown in FIG. 3. Consequently, the raster area 176 on quadrant portion 56 is scanned vertically by electron beam 40 being deflected from the plane 53 in the direction of vertical vector 63. Also, as shown in FIG. 10G, the composite horizontal scan waveform 170 includes a first full envelope 172 extending in the positive direction from baseline 171 of waveform 170 and having an initial half-length occurring simultaneously with the first full sawtooth pulse 168 of waveform 166. Envelope 172, as shown in FIG. 10H, comprises a repetitive series of uniform sawtooth pulses 174 having respective sloped trailing edges extending from a uniform positive maximum value and terminating at the baseline 171 of waveform 170 which may be considered as corresponding to the electron beam being at the plane 55 shown in FIG. 3. Thus, the raster area 176, while being scanned vertically in the direction of vertical vector 63, is scanned repeatedly in the horizontal direction of horizontal vector 67. Accordingly, since the scanning of raster area 176 is performed in the conventional manner of reading a page of a book, it may conveniently serve as a standard to which the scanning of the other raster areas 177-179, respectively, may be compared for purposes of illustration.

As shown in FIG. 10F, after the first full sawtooth pulse 168 reaches a maximum positive value, it falls rapidly back to the baseline 167 of waveform 166 which corresponds to the electron beam 40 returning to the plane 53. A succeeding sawtooth pulse 169 extends in the negative direction from the baseline 167 of waveform 166 and occurs simultaneously with the remaining half-length of the first full envelope 172 in waveform 170. Consequently, by referring again to the positive sawtooth pulses 174 shown in FIG. 10H and to FIG. 3, it may be seen that the raster area 177 on quadrant portion 57 is scanned by the electron beam 40 being deflected vertically from plane 53 in the direction of vertical vector 65, while being deflected repeatedly in the horizontal direction conforming to horizontal vector 67. Thus, the raster area 177 is scanned horizontally in the same direction as used for horizontal scanning of raster area 176, but is scanned vertically in the inverse direction as compared to the vertical scanning of raster area 176.

Referring again to FIG. 10F, after the negative sawtooth pulse 169 reaches a minimum or nadir value, it rises rapidly back to the baseline 167 of waveform 166 which corresponds to the scanning electron beam 40 returning to the plane 53 shown in FIG. 3. Then, there occurs in the waveform 160 a second sawtooth pulse 168 which extends in the positive direction from the baseline 167 of waveform 166. As a result, the raster area 178 on quadrant portion 58 is scanned vertically by the electron beam 40 being deflected from the plane 53 in the direction of vertical vector 63. Also, as shown in FIG. 10G, the composite horizontal scan waveform 170 includes a first full envelope 173 which extends in the negative direction from baseline 171 of waveform 170 and has an initial half-length occurring simultaneously with the second sawtooth pulse 168 of waveform 166. Envelope 173, as shown in FIG. 10H, comprises a repetitive series of uniform sawtooth pulses 175 having respective sloped trailing edges extending from uniform negative peak values and terminating at the baseline 171 of waveform 170 where the electron beam 40 may be considered as being at the plane 55 shown in FIG. 3. Consequently, the raster area 178, while being scanned vertically in the direction of vertical vector line 63, is scanned repeatedly in the horizontal direction by the electron beam 40 being deflected repeatedly toward the plane 55 in the direction of horizontal vector 69. Thus, the raster area 178 is scanned vertically in the same direction used for the vertical scanning of raster area 176, but is scanned horizontally in the inverse direction as compared to the horizontal scanning of raster area 176.

As shown in FIG. 10F, after the second sawtooth pulse 168 reaches a peak positive value, it falls rapidly back to the baseline 167 of waveform 166 which corresponds to the electron beam 40 returning to the plane 53 shown in FIG. 3. Subsequently, there occurs in the waveform 166 a succeeding sawtooth pulse 169 which extends in the negative direction from the baseline 167 of waveform 166 and occurs simultaneously with the remaining half-length of the first full negative envelope 173 in waveform 170. Consequently, by referring again to the negative sawtooth pulses 175 shown in FIG. 10H and to FIG. 3, it may be seen that the raster area 179 on quadrant portion 59 is scanned by the electron beam 40 being deflected vertically from plane 53 in the direction of vertical vector 65, while being deflected repeatedly in the horizontal direction of horizontal vector 69. Thus, the raster area 179 is scanned vertically and horizontally in respective inverse directions as compared to the vertical and horizontal scanning of raster area 176.

Accordingly, by referring to the respective vertical vectors 63 and 65 it may be seen that all of the raster areas 176-179, respectively, are scanned vertically from the plane 53 and along of imaging screen 60 toward one or the other of its opposing ends. Also, by referring to the respective horizontal vectors 67 and 69, it may be seen that all of the raster areas 176-179, respectively, are scanned horizontally from one or the other opposing sides of imaging screen 60 and inwardly thereof toward the plane 55. Consequently, all of the raster areas 176-179, respectively, are grouped symmetrically about the central portion 61 of imaging screen 60 where the respective planes 53 and 55 intersect one another. Moreover, the respective raster areas 177 and 179 are scanned inversely in the vertical direction from plane 53 as compared to the vertical scanning of raster areas 176 and 178, respectively. Furthermore, the respective raster areas 178 and 179 are scanned inversely in the horizontal direction toward plane 55 as compared to the horizontal scanning of raster areas 176 and 177, respectively. Accordingly, each of the respective raster areas 176-179 is scanned in at least one direction which is inverse as compared to the directions of scanning the other three raster areas.

As shown in FIG. 9, the output conductors 146-147 of counter 94, in addition to being connected to the actuating elements of respective vertical switching devices 142 and 143, also are connected to respective input terminals of a conventional decoder device 180. Moreover, the output conductors 148-149 of counter 96, in addition to being connected to the actuating elements of respective horizontal switching devices 144 and 145, also are connected to respective input terminals of the decoder device 180. The decoder device 180 has four output terminals connected electrically through respective conductors 182, 183, 184 and 185 to actuating elements of brightness control switching devices 186, 187, 188 and 189, respectively. The brightness control switching devices 186, 187, 188 and 189 have respective stationary contact elements connected, in common, through the conductor 194 to the video amplifier means 84 which has its output connected through the conductor 72 to control grid 38 of tube 22. The movable arm contact elements of switching devices 186, 187, 188 and 189 are connected electrically through respective conductors to wiper arms of brightness control potentiometers 190, 191, 192 and 193, respectively. Resistive elements of the brightness control potentiometers 190–193 have respective corresponding end portions connected, in common, through the conductor 79 to the output of video signal means 89 in control signal source 87. Also, the resistive elements of brightness control potentiometers 190–193 have respective opposing end portions connected, in common, through a conductor 195 to electrical ground.

Thus, the decoder device 180 is connected for sensing at its input terminals when energizing voltage signals are removed from combinations of the respective conductors 146–149 to close an associated combination of the vertical and horizontal scan switching devices 142–143 and 144–145, respectively. As a result, the decoder device 180 is enabled to remove simultaneously an energizing voltage signal from a respective one of its output conductors 182–185 to close an associated one of the brightness control switching devices 186–189, respectively. Consequently, when a suitable combination of vertical and horizontal scan signals are fed through the respective output conductors 151 and 152 for scanning a particular one the raster areas 176–179, respectively, a corresponding brightness control signal is fed through the output conductor 194 to the video amplifier means 84.

Consequently, the decoder device 180 applies to its output conductors 182–185 respective voltage signals which, as shown in FIG. 10E, may be represented by waveform 196–199, respectively. By comparing the waveforms in FIGS. 10C, 10D and 10E it may be seen that a zero voltage interval 200 of one period duration occurs in the waveform 196 simultaneously with the first full zero voltage interval 156 in waveform 153 and with an initial half-length of the first full zero voltage interval 162 in waveform 159. Also, a sequential zero voltage interval 201 of one period duration occurs in the waveform 197 simultaneously with a first full zero voltage interval 158 in the waveform 154 and with the remaining half-length of zero voltage interval 162 in waveform 159. Moreover, further sequential zero voltage interval 202 of one period duration occurs in the waveform 198 simultaneously with a second zero voltage interval 156 in waveform 153 and with an initial half of a first full zero voltage interval 164 in the waveform 160. Then, a still further sequential zero voltage interval 203 of one period duration occurs in the waveform 199 simultaneously with a second zero voltage interval 158 in the waveform 154 and with the remaining half-length of zero voltage interval 164 in waveform 160. At the completion of zero voltage interval 203 in waveform 199, another zero voltage interval 200 of one period duration occurs in the waveform 196 simultaneously with a third zero voltage interval 156 in waveform 153 and with an initial half-length of second zero voltage interval 162 occurring in the waveform 159. Thus, the sequential occurence of zero voltage intervals 200, 201, 202 and 203 in the respective waveforms 196, 197, 198 and 199 is continuously repeated during the scanning of raster areas 176–179, respectively.

Also, by comparing the waveforms in FIGS. 10E, 10F and 10G it may be seen that the zero voltage interval 200 in waveform 196 occurs simultaneously with the first full sawtooth pulse 168 in composite vertical scan waveform 166 and with the initial half-length of the first full envelope 172 in composite horizontal scan waveform 170. Moreover, the zero voltage interval 201 in waveforms 197 occurs simultaneously with the first full sawtooth pulse 169 in composite vertical scan waveform 166 and with the remaining half-length of the first full envelope 172 in composite horizontal scan waveform 170. Furthermore, the zero voltage interval 202 in waveform 198 occurs simultaneously with the second full sawtooth pulse 168 in composite vertical scan waveform 166 and with the initial half-length of the first full envelope 173 in composite horizontal scan waveform 170. In addition, the zero voltage interval 203 in waveform 199 occurs simultaneously with the second full sawtooth pulse 169 in composite vertical scan waveform 166 and with the remaining half-length of the first full envelope 173 in composite horizontal scan waveform 170.

Accordingly, with reference to FIG. 9, when the respective vertical and horizontal scan switching devices 142 and 144 are closed for the scanning of raster area 176, brightness control switching device 186 is closed simultaneously so that the setting of potentiometer 190 controls the average brightness level of red light emitted from raster area 176. Also, when the respective vertical and horizontal scan switching devices 143 and 144 are closed for the scanning of raster area 177, brightness control switching device 187 is closed simultaneously so that the setting of potentiometer 191 controls the average brightness level of green light emitted from raster area 177. Moreover, when the respective vertical and horizontal scan switching devices 142 and 145 are closed for the scanning of raster area 178, brightness control switching device 188 is closed simultaneously so that the setting of potentiometer 192 controls the average brightness level of blue light emitted from raster area 178. Furthermore, when the respective vertical and horizontal scan switching devices 143 and 145 are closed for the scanning of raster area 179, brightness control switching device 189 is closed simultaneously so that the setting of potentiometer 193 controls the average brightness level of blue light emitted from the raster area 179.

While referring to FIG. 9, it should be noted that an input video signal may be fed from the video signals means 89 in control signal source 87 and through the conductor 79 to be applied across the resistive elements of brightness control potentiometers 190–193, respectively. Consequently, instantaneous variations in the input video signal are sensed at the wiper arms of brightness control potentiometers, 190193, respectively, and produce corresponding instantaneous variations in the signal fed through the closed one of the respective switching devices 186–189 to the common output conductor 194 which is connected to the input of video amplifier means 84. As a result, the output signal having the corresponding instantaneous variations is amplified and applied through the conductor 72 to the control grid 38 of electron gun 30. The resulting instantaneous variations in the electrical potential of control grid 38 cause corresponding instantaneous variations in the intensity of electron beam 40 emanating from gun 30.

Thus, when the electron beam 40 is scanning a particular one of the respective raster areas 176-179, the average intensity of the beam 40 is controlled by adjustment of the associated one of the brightness control potentiometers 190-193, respectively, while the instantaneous intensity of the beam 40 is controlled by instantaneous variations in the associated portions of the input video signal conveying informational data.

Accordingly, as shown in FIG. 3, when the electron beam 40 scans raster area 176, the instantaneous intensity of beam 40 may be varied to produce in raster area 176 respective alphanumeric characters 204, 205, 206 and 207. The character 204 represents an entirely red R portion of a subject for display; and the character 205 represents a red component of a yellow Y portion of the subject. Similarly, the character 206 represents a red component of a white W portion of the subject; and the character 207 represents a red component of a purple P portion of the subject. Moreover, when the electron beam 40 scans raster area 177, the instantaneous intensity of beam 40 may be varied to produce in raster area 177 respective alphanumeric characters 208, 209 and 210. The character 208 represents an entirely green G portion of the subject; the character 209 represents a green component of the yellow Y portion of the subject; and the character 210 represents a green component of the white W portion of the subject. However, because the raster area 177 is scanned in the opposite vertical direction as compared to the vertical scanning of raster area 176, the characters 208-210 are inverted vertically as compared to the characters 204-207. Also, in the vertical direction, the respective characters 209 and 210 in raster area 177 comprise vertically inverted duplicates of the respective characters 205 and 206 in raster area 176.

Furthermore, when the electron beam 40 scans raster area 178, the instantaneous intensity of beam 40 may be varied to produce in raster area 178 respective alphanumeric characters 212, 213 and 214. The character 212 represents an entirely blue B portion of the subject; the character 213 represents a blue component of purple P portion of the subject; and the character 214 represents a blue component of the white W portion of the subject. Because the raster area 178 is scanned in the opposite horizontal direction as compared to the horizontal scanning of raster area 176, the characters 212-214 in raster area 178 are inverted horizontally as compared to the characters 204-207 in raster area 176. Also, in the horizontal direction, the respective characters 213 and 214 in raster area 178 comprise mirror images of the respective characters 207 and 206 in raster area 176.

Similarly when the electron beam 40 scans raster area 179, the instantaneous intensity of beam 40 may be varied to produce in raster area 179 respective alphanumeric characters 216, 217 and 218. The character 216 represents the entirely blue B portion of the subject; the character 217 represents the blue component of the purple P portion of the subject; and the character 218 represents the blue component of the white W portion of the subject. However, because the raster area 179 is scanned vertically and horizontally in respective opposite directions as compared to the vertical and horizontal scanning of raster area 176, the characters 216-218 in raster area 179 are inverted both vertically and horizontally as compared to the characters 204-207 in raster area 176. Also, the respective characters 216-218 in raster area 179 are vertically inverted duplicates of the respective equivalent characters 212-214 in raster area 178. In addition, the character 218 is a mirror image of the equivalent character 210 in raster area 177.

Thus, in addition to each of the raster areas 176-179 being scanned inversely in at least one direction as compared to the coordinate directions for scanning the other three raster areas, the respective characters produced on each of the raster areas 176-179 are oriented correspondingly relative to the respective characters produced on the other three raster areas. Furthermore, each of the raster areas 176-179 is scanned by electron beam 40 in a respective manner relative to central portion 61 of imaging screen 60 whereby corresponding spot-sized regions of the raster areas 176-179 are addressed in the same sequential order and in substantially equal intervals of scanning time. Consequently, respective characters common to more than one of the raster areas 176-179, respectively, are positioned symmetrically relative to the central portion 61 of imaging screen 60. Also, characters unique to any one of the respective raster areas 176-179 are positioned relative to the central portion 61 of imaging screen 60 such that corresponding portions of the other three raster areas are left blank. As a result, the imaging screen 60 may be optically folded along the lines defined by intersecting plane 53 and 55, respectively, to have component duplicate characters produced on more than one raster area overlie one another congruently and to have characters unique to any one raster area not overlie a character on another raster area.

Accordingly, as shown in FIGS. 1 and 2, the image display system 20 is provided with an optical combiner assembly 220 which is disposed externally of tube 22 and is optically coupled through faceplate 54 to the imaging screen 60. The optical combiner assembly 220 may include a mirror 224 aligned with quadrant portion 56 and having a reflecting surface disposed with respect to faceplate 54 at an acute angle, such as forty-five degrees, for example, which is measured counterclockwise from faceplate 54 to the reflecting surface of mirror 224. Mirror 224 is predominantly reflective to red light, such as emitted from the phosphor material of quadrant portion 56, for example. The optical combiner assembly 220 also may include a mirror 225 aligned with the quadrant portion 58 and having a reflecting surface disposed with respect to faceplate 54 at an acute angle, such as forty-five degrees, for example, which is measured counterclockwise from the faceplate 54 to the reflecting surface of mirror 225. Mirror 225 is predominantly reflective to blue light, such as emitted from the phosphor material of quadrant portion 58, for example.

Use of the separate mirrors 224 and 225 in the optical combiner assembly 220 may be advantageous when independent angular adjustment of the mirrors with respect to faceplate 54 is required. However, when the optical combiner assembly 220 is designed to have both of the mirrors 224 and 225 disposed at the same acute angle with respect to faceplate 54, the separate mirrors 224 and 225, as shown in an alternative embodiment 220a in FIGS. 4-7, may be replaced by a single mirror 222 which is disposed at the specified acute angle with respect to faceplate 54. Mirror 222 has respective half-portions 224a and 225a which are aligned with quadrant portions 56 and 58, respectively, and which function similar to the separate mirrors 224 and 225, respectively. Accordingly, the half-portion 224a of mirror 222 is predominantly reflective to red light emitted from raster area 176; and the half-portion 225a of mirror 222 is predominantly reflective to blue light emitted from raster area 178.

The optical combiner assembly 220 may include a dichroic filter 228 which is disposed substantially coplanar with the portion of plane 53 between quadrant portions 56 and 57, respectively, and is oriented substantially perpendicular to the faceplate 54. Dichroic filter 228 is predominantly transmissive to red light and predominantly reflective to green light. The optical combiner assembly 220 also includes a dichroic filter 229 which is disposed coplanar with the portion of plane 53 between quadrant portions 58 and 59, respectively, and is oriented substantially perpendicular to the faceplate 54. Dichroic filter 229 is predominantly transmissive to short wavelengths of blue light and predominantly reflective to long wavelengths of blue light.

Alternatively, as shown in the optical combiner assembly 220a in FIGS. 4-7, the separate dichroic filters 228 and 229, respectively, may be replaced by a single filter 226. Filter 226 is disposed substantially coplanar with the plane 53 and is oriented substantially perpendicular to faceplate 54. The filter 226 is comprised of respective half-portions 228a and 229a which function similar to the separate filters 228 and 229, respectively. Accordingly, the filter half-portion 228a is predominantly transmissive to red light and predominantly reflective to green light. Furthermore, the filter half-portion 229a is predominantly transmissive to short wavelengths of blue light and predominantly reflective to long wavelengths of blue light.

The optical combiner assembly 220 also may include a beamsplitter 232 aligned with quadrant portion 57 of imaging screen 60 and disposed with respect to raster area 177 at a suitable acute angle, such as forty-five degrees, for example, which is opposite to the angular disposition of mirror 224 and measured clockwise from the faceplate 54. The beamsplitter 232, which is predominantly transmissive to red light, is about fifty percent transmissive and fifty percent reflective to green light, such as emitted from the phosphor material of quadrant portion 57, for example. Optical combiner assembly 220 also may include a beamsplitter 233 aligned with quadrant portion 59 of imaging screen 60 and disposed at a suitable acute angle, such as forty-five degrees, for example, which is opposite to the angular disposition of mirror 225 and measured clockwise from faceplate 54. The beamsplitter 233 is about fifty percent transmissive and fifty percent reflective to long wavelengths of blue light, such as emitted from the phosphor material of quadrant portion 59, for example, and preferably is predominently transmissive to short wavelengths of blue light, such as that emitted from the phosphor material of quadrant portion 58, for example.

Alternatively, as shown in the optical combiner assembly 220a in FIGS. 4-7, the separate beamsplitters 232 and 233, respectively, may be replaced by a single beamsplitter 230 aligned with the quadrant portions 57 and 59, and disposed at the specified suitable angle, such as forty-five degrees, for example, which is opposite to the angular disposition of single mirror 222 and measured clockwise from the faceplate 54. Beamsplitter 230 is comprised of respective half-portions 232a and 233a which are aligned with quadrant portions 57 and 59, respectively, and function similar to the mirrors 232 and 233, respectively. Therefore, the beamsplitter half-portion 232a is predominantly transmissive to red light and is about fifty percent transmissive, fifty percent reflective to green light. Moreover, the beamsplitter half-portion 233a is predominantly transmissive to short wavelengths of blue light and about fifty percent transmissive, fifty percent reflective to long wavelengths of blue light.

The optical combiner assembly 220 also may include a recovery mirror 238 which is aligned with the beamsplitter 232 and disposed on the far side thereof in substantially parallel relationship with the faceplate 54. Recovery mirror 238 is predominantly reflective to green light, such as emitted from the phosphor material of quadrant portion 57 and transmitted through the beamsplitter 232, for example. In addition, the optical combiner assembly 220 may include a recovery mirror 239 which is aligned with the beamsplitter 233 and disposed on the far side thereof in substantially parallel relationship with the faceplate 54. Recovery mirror 239 is predominantly reflective to long wavelengths of blue light, such as emitted from the phosphor material of quadrant portion 59 and transmitted through the beamsplitter 233, for example.

Alternatively, as shown in the optical combiner assembly 220a in FIGS. 4-7, the recovery mirrors 238 and 239 may be replaced by a single recovery mirror 236 which is aligned with the respective beamsplitter half-portions 232a and 233a of single beamsplitter 230 and is disposed on the far sides thereof in substantially parallel relationship with the faceplate 54. Beamsplitter 236 is comprised of respective half-portions 238a and 239a which are aligned with beamsplitter half-portions 232a and 233a, respectively, and function similar to the separate recovery mirrors 238 and 239, respectively. Accordingly, the recovery mirror half-portion 238a is predominantly reflective to green light; and the recovery mirror half-portion 239a is predominantly reflective to long wavelengths of blue light.

Thus, in optical combiner assembly 220, the array of optical elements comprising mirror 224, filter 228 and beamsplitter 232 form a tent-like substructure which is mounted on faceplate 54 such that the filter 228 constitutes an extension of the portion of plane 53 between the quadrant portions 56 and 57, respectively. Furthermore, the mirror 224 and beamsplitter 232 aligned with the respective quadrant portions 56 and 57 are oriented to form with filter 228 respective opposing acute angles which are complements of the angles formed by mirror 224 and beamsplitter 232 with the faceplate 54, respectively. Also, the array of optical elements comprising mirror 225, filter 229 and beamsplitter 233 form a tent-like substructure which is mounted on faceplate 54 such that the filter 229 constitutes an extension of the portion of plane 53 between the quadrant portions 58 and 59, respectively. Moreover, the mirror 225 and beamsplitter 233 aligned with the respective quadrant portions 58 and 59 are oriented to form with the filter 229 respective opposing acute angles which are complements of the angles formed by mirror 225 and beamsplitter 233 with the faceplate 54, respectively.

Extending from one edge of faceplate 54 is a similar tent-like substructure comprising a mirror 240, a filter 241 and a beamsplitter 242. The mirror 240 is disposed in alignment with the tent-like substructure comprising mirror 224, filter 228 and beamsplitter 232 and is oriented at an acute angle with respect to filter 241 which constitutes an extension of plane 55. Similarly, the beamsplitter 242 is disposed in alignment with the tent-like substructure comprising mirror 225, filter 229 and beamsplitter 233 and is oriented, as compared to mirror 240, at an opposing acute angle with respect to filter 241. The respective opposing acute angles formed by the mirror 240 and the beamsplitter 242 with the filter 241 may be complements of the angles formed by the mirror 240 and the beamsplitter 242 with the adjacent edge of faceplate 54, respectively. Mirror 240 is predominantly reflective to red light, green light and intermediate color lights of the visible light spectrum. The filter 241, which is predominantly transmissive to red light, green light and said intermediate color lights, is predominantly reflective to blue light. Beamsplitter 242, which is predominantly transmissive to red light, green light, and said intermediate color lights, is about fifty percent transmissive and fifty percent reflective to blue light.

As shown in the optical combiner assembly 220a in FIGS. 4-7, the single mirror 222, the single filter 226 and the single beamsplitter 230 also form a tentlike substructure which is mounted on faceplate 54 such that the filter 226 constitutes an extension of plane 53. The mirror half-portion 224a and the beamsplitter half-portion 232a aligned with quadrant portions 56 and 57, respectively, are oriented to form with the filter half-portion 228a respective opposing acute angles which are complements of the angles formed by the mirror half-portion 224a and the beamsplitter half-portion 232a with the faceplate 54, respectively. Also, the mirror half-portion 225a and the beamsplitter half-portion 233a form with the filter half-portion 229a respective opposing acute angles which are complements of the angles formed by the mirror half-portion 225a and the beamsplitter half-portion 233a with the faceplate 54, respectively.

Extending from one edge of faceplate 54, as previously described, is the tent-like substructure comprising first mirror 240, filter 241 and beamsplitter 242. Mirror 240 is disposed in alignment with the tent-like array of optical elements comprising mirror half-portion 224a, filter half-portion 228a and beamsplitter half-portion 232a. Similarly, the beamsplitter 242 is disposed in alignment with the tent-like array of optical elements comprising mirror half-portion 225a, filter half-portion 229a and beamsplitter half-portion 233a. Furthermore, the mirror 240 and beamsplitter 242 form with the filter 241 respective opposing acute angles which may be complements of the angles formed by the mirror 240 and beamsplitter 242 with the adjacent edge of faceplate 54, respectively. Accordingly, in the alternative embodiment shown in FIGS. 4-7, the mirror 240 and beamsplitter 242 as well as the filter 241 are disposed to function in manners similar to their respective functions in the embodiment shown in FIG. 2.

Figure 4:
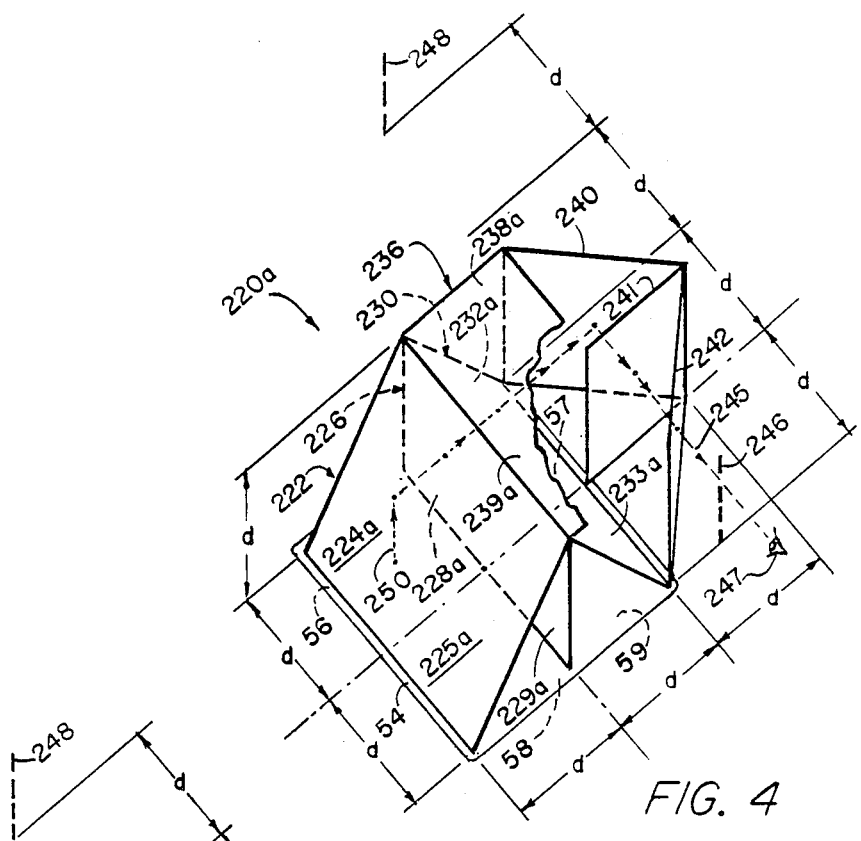
FIG. 4 is a schematic isometric view of an alternative embodiment of the optical combiner assembly shown in FIG. 2 and illustrating an optical path of red light emanating from one quadrant portion of the output screen.

In operation, red light emitted from raster area 176 of quadrant portion 56, as illustrated by red light ray 250 shown in FIG. 4, for example, is reflected by mirror half-portion 224a in the direction of filter half-portion 228a. Consequently, the red light ray 250 is transmitted through filter half-portion 228a and through beamsplitter half-portion 232a to impinge on the mirror 240. As a result, the red light ray 250 is reflected by mirror 240 in the direction of optical axis 245 to pass through the filter 241 and the beamsplitter 242. Accordingly, the red light ray 250 passes through an exit plane, which is indicated as 246, of optical combiner assembly 220a to an observer's eye 247 which is positioned on or near the optical axis 245.

Thus, the red light from raster area 176, as illustrated by ray 250, travels within the optical combiner assembly 220 from raster area 176 to exit plane 246 a total optical path equivalent to four times a unitary path length "d" which may be defined as the center-to-center distance of adjacent quadrant portions 56-59, respectively. Therefore, the observer's eye 247 sees a virtual image of the red raster area 176 at a plane designated as 248, which is located an equivalent optical distance of four times "d" from the exit plane 246 of assembly 220. Also, it may be noted that, as a result of the reflections of red light from raster area 176 at the mirror half-portion 224a and mirror 240, the observer's eye 247 sees the image of raster area 176 at the plane 248 as upright and disposed in the conventional left-to-right orientation, such as found suitable for reading the page of a book, for example.

Figure 5:
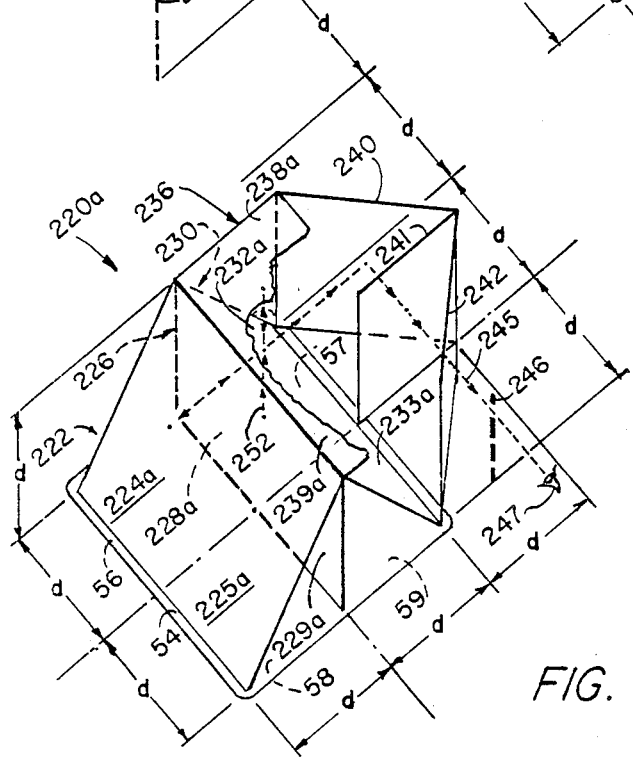
FIG. 5 is a schematic view similar to FIG. 4 but illustrating an optical path of green light emanating from a second quadrant portion of the output screen.

The green light emitted from raster area 177 of quadrant portion 57, as illustrated by green light ray 252 shown in FIG. 5, for example, is about fifty percent reflected and fifty percent transmitted by the beamsplitter half-portion 232a. Consequently, the reflected portion of green light ray 252 is reflected by the filter half-portion 228a back to the beam-splitter half-portion 232a where about fifty percent is reflected back to raster area 177 and fifty percent is transmitted through beamsplitter half-portion 232a in the direction of mirror 240. Also, the portion of green light initially transmitted through beamsplitter half-portion 232a is reflected by the recovery mirror half-portion 238a back to the beamsplitter half-portion 232a where about fifty percent is transmitted through it in the direction of raster area 177 and fifty percent is reflected in the direction of mirror 240. Accordingly, the green light impinging on mirror 240, as illustrated by green light ray 252, is reflected by mirror 240 in the direction of optical axis 245 to pass through the filter 241 and beamsplitter 242. As a result, the green light transmitted through beamsplitter 242 passes through exit plane 246 to the observer's eye 247.

Thus, the green light reaching the observer's eye 247 travels within the optical combiner assembly 220a from raster area 177 to exit plane 246 a total optical path equivalent to four times the unitary path length "d". Therefore, the observer's eye 247 sees a virtual image of green raster area 177 at the plane 248 located an equivalent optical distance of four times "d" from the exit plane 246. Also, it may be noted that, as a result of the green light reflections at the beamsplitter half-portion 232a and at the mirror 240, the observer's eye 247 sees the image of raster area 177 at the plane 248 as upright and oriented left-to-right similarly to the image of raster area 176 at the plane 248. Accordingly, the images of raster area 176 and 177 at the plane 248 appear to the observer's eye 247 as superimposed on one another.

Figure 6:
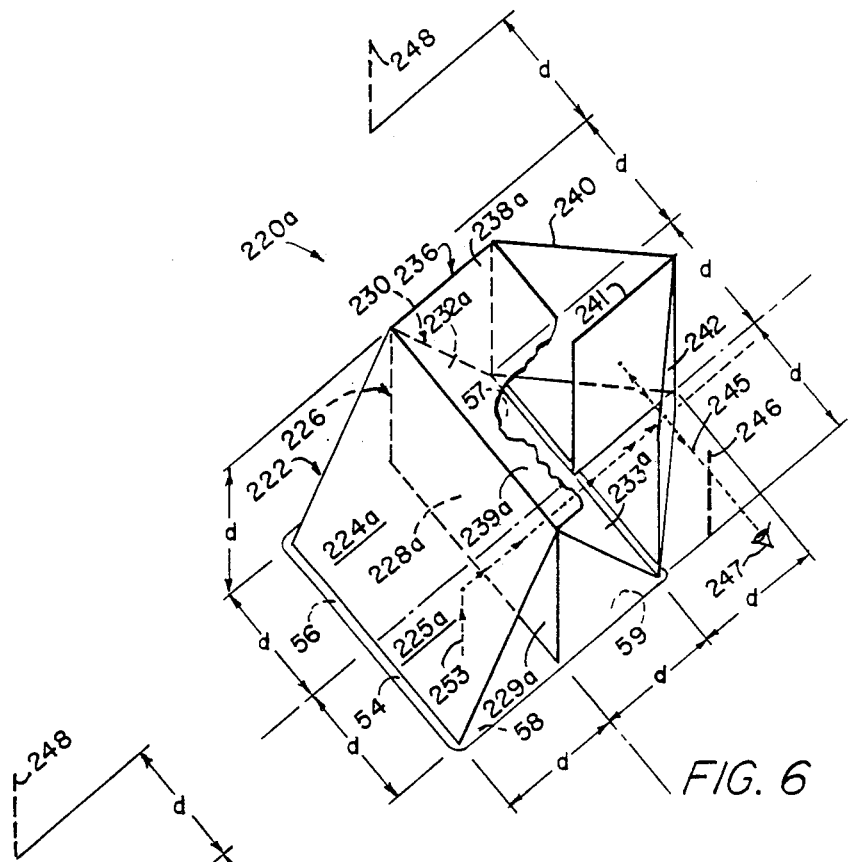
FIG. 6 is a schematic view similar to FIG. 4 but illustrating an optical path of blue light emanating from a third quadrant portion of the output screen.

Furthermore, the blue light emitted from raster area 178 of quadrant portion 58, as illustrated by blue light ray 253 in FIG. 6, for example, is reflected by mirror half-portion 225a in the direction of filter half portion 229a. Consequently, the blue light ray 253 is transmitted through filter half-portion 229a and beamsplitter half-portion 233a to impinge on beamsplitter 242. As a result, about fifty percent of the blue light ray 253 is transmitted through the beamsplitter 242 and is lost from the system. About fifty percent of blue light ray 253 is reflected by beamsplitter 242 in the direction of optical axis 245 and toward the filter 241. Accordingly, the portion of blue light ray 253 impinging on filter 241 is reflected back to beamsplitter 242 where about fifty percent is reflected in the direction of beamsplitter half portion 233a and about fifty percent is transmitted through the beamsplitter 242 and the exit plane 246 to the observer's eye 247.

Thus, the portion of blue light ray 253 from raster area 177 reaching the observer's eye 247 travels within the optical combiner assembly 220a from raster area 177 to exit plane 246 a total optical path length equivalent to four times the unitary path length "d". Therefore, the observer's eye 247 sees a virtual image of blue raster area 178 at the plane 248 located an equivalent optical distance of four times "d" from the exit plane 246. Also, it may be seen that, as a result of the reflections at the mirrors 225a and 242, respectively, the observer's eye 247 sees the image of raster area 178 at the plane 248 in the upright position and similarly oriented to the images of raster areas 176 and 177, respectively. As a result, the image of raster area 178 at plane 248 appears to the observer's eye 247 as superimposed on the similarly oriented images of raster areas 176 and 177, respectively.

Figure 7:
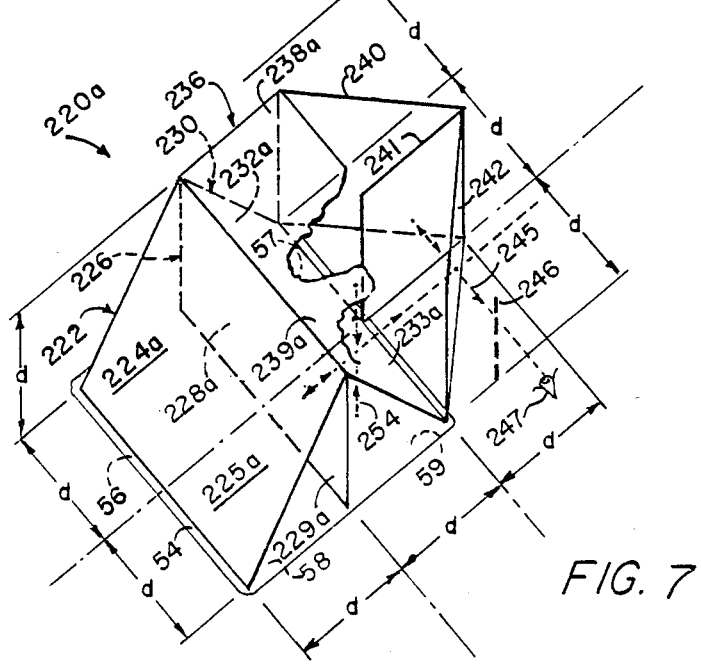
FIG. 7 is a schematic view similar to FIG. 4 but illustrating an optical path of blue light emanating from a fourth quadrant portion of the output screen.

In addition, the blue light emitted from raster area 179 of quadrant portion 59, as illustrated by the blue light ray 254 in FIG. 7, for example, is about fifty percent reflected and fifty percent transmitted by the beamsplitter half-portion 233a. Consequently, the reflected portion of blue light ray 254 is reflected back by the filter half-portion 229a to the beamsplitter half-portion 233a where about fifty percent is reflected back to raster area 179 and fifty percent is transmitted through the beamspliter half-portion 233a in the direction of beamsplitter 242. Also, the transmitted portion of blue light ray 254 is reflected back by recovery mirror half-portion 239a to the beamsplitter half-portion 233a where about fifty percent is transmitted through the beamsplitter half-portion 233a to the raster area 179 and fifty percent is reflected by the beamsplitter half-portion 233a in the direction of beamsplitter 242. Accordingly, with respect to the portions of blue light ray 254 impinging on beamsplitter 242, about fifty percent is transmitted through beamsplitter 242 and is lost to the system while fifty percent is reflected in the direction of optical axis 245 toward the filter 241. The portions of blue light ray 254 impinging on filter 241 are reflected back to the beamsplitter 242 where about fifty percent is reflected in the direction of beamsplitter half-portion 233a and about fifty percent is transmitted through the beam-splitter 242.

Thus, the portions of blue light ray 254 transmitted through beamsplitter 242 and exit plane 246 to the observer's eye travel within the optical combiner assembly 220 from raster area 179 to exit plane 246 a total optical path equivalent to four times the unitary path length "d". Therefore, the observer's eye 247 sees the image of raster area 179 at the plane 248 located an equivalent optical distance of four times "d" from the exit plane 246. Also, because of the reflections at beamsplitter half-portion 233a and beamsplitter 242, the observer's eye 247 sees the image of raster area 179 at the plane 248 in the upright position and similarly oriented left-to-right with respect to the images of raster areas 176, 177 and 178, respectively.

Figure 8:
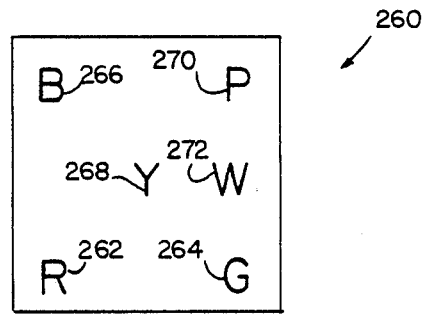
FIG. 8 is a schematic view of a single combined image of the four images produced on the quadrant portions of the output screen shown in FIG. 3 and as seen by the observer's eye positioned as shown in FIG. 2.

Accordingly, the observer's eye 247 sees, as shown in FIG. 8, a single multi-color image 260 which comprises a composite of the superimposed images of raster areas 176, 177, 178 and 179, respectively. The single image 260 includes an entirely red portion comprising a red R character 262 which corresponds to the entirely red R character 204 in raster area 176 shown in FIG. 3. Also, the single image 260 includes an entirely green portion comprising a green G character 264 which corresponds to the entirely green G character 208 in raster area 177 shown in FIG. 3. Moreover, the single image 260 includes an entirely blue portion comprising a blue B character 266 which corresponds to the combination of short wavelengths of blue and long wavelengths of blue B characters 212 and 216 in raster areas 178 and 179, respectively, shown in FIG. 3. Furthermore, the single image 260 includes a yellow Y character 268, a purple P character 270, and a white W character 272. The yellow Y character 268 in image 260 corresponds to the combination and blending of the red component character 205 in raster area 176 and the green component character 209 in raster area 177 shown in FIG. 3. Also, the purple P character 270 in image 260 corresponds to the combination and blending of the red component character 207 in raster area 176, the blue component character 213 in raster area 178 and the blue component character 217 in raster area 179 shown in FIG. 3. Similarly, the white W character 272 in image 260 corresponds to the combination of the white component characters 206, 210, 214 and 218 in raster areas 176, 177, 178 and 179, respectively, shown in FIG. 3.

As shown in FIG. 2, the mirror 224, filter 228 and beam-splitter 232 function similar to the mirror half-portion 224a, filter half-portion 228a and beamsplitter half-portion 232a, respectively. Thus, the red light ray 250 emitted from raster area 176 is reflected by mirror 224 to pass through the filter 228 and the beamsplitter 232 thereby impinging on the mirror 240. Also, the green light ray 252 emitted from raster area 177 is partly reflected by beamsplitter 232 in the direction of filter 228, and is partly transmitted through beamsplitter 232 in the direction or recovery mirror 238. The portion of green light ray 252 impinging on filter 228 is reflected back to beamsplitter 232 where it is partly reflected in the direction of raster area 177 and is partly transmitted through beamsplitter 232 in the direction of mirror 240. The portion of green light ray 252 impinging on recovery mirror 238 is reflected back to beamsplitter 232 where it is partly transmitted in the direction of raster area 177 and is partly reflected in the direction of mirror 240.

As a result, the portions of red light ray 250 and green light ray 252 impinging on mirror 240 are reflected in the direction of optical axis 245 to pass through the filter 241 and the beamsplitter 242. Consequently, the portions of red light ray 250 and green light ray 252 transmitted through beamsplitter 242 pass through exit plane 246 to the observer's eye 247 disposed on or near the optical axis 245. Accordingly, these portions of red light ray 250 and green light ray 252 travel within the optical combiner assembly 220 from raster areas 176 and 177, respectively, to exit plane 246 a total optical path equivalent to four times the unitary path length "d". Therefore, the observer's eye 247 sees respective virtual images of red raster area 176 and green raster area 177 at plane 248 located an equivalent optical distance of four times "d" along optical axis 245 from exit plane 246. Furthermore, due to the described reflections of red and green light, the observer's eye 247 sees the respective virtual images of red raster area 176 and green raster area 177 as upright and disposed in conventional left-to-right orientation such that they appear to be superimposed on one another and comprise a single combined image.

Also, as shown in FIG. 2, the mirror 225, filter 229 and beamsplitter 233 function similar to the mirror half-portion 225a, filter half-portion 229a and beamsplitter half-portion 233a, respectively. Thus, the blue light ray 253 emitted from blue raster area 178 is reflected by mirror 225 to pass through the filter 229 and beamsplitter 233 thereby impinging on beamsplitter 242. Also, the blue light ray 254 emitted from blue raster area 179 is partly reflected by beamsplitter 233 in the direction of filter 229, and is partly transmitted through beamsplitter 233 in the direction of recovery mirror 239. The portion of blue light ray 254 impinging on filter 229 is reflected back to beamsplitter 233 where it is partly reflected in the direction of raster area 179 and is partly transmitted in the direction of beamsplitter 242. The portion of blue light ray 254 impinging on recovery mirror 239 is reflected back to beamsplitter 233 where it is partly transmitted in the direction of raster area 179 and is partly reflected in the direction of beamsplitter 242.

As a result, some portions of the blue light rays 253 and 254, respectively, impinging on beamsplitter 242 are transmitted therethrough and lost to the system. Other portions of the blue light rays 253 and 254, respectively, are reflected by the beamsplitter 242 to the filter 241 where they are reflected back to beamsplitter 242. Some portions of these blue rays reflected back to beamsplitter 242 are reflected in the direction of beamsplitter 233; and other portions of these blue light rays reflected back from filter 241 pass through the beamsplitter 242. Consequently, the portions of blue rays 253 and 254 transmitted through beamsplitter 242 pass through the exit plane 246 to the observer's eye 247. Accordingly, these portions of blue light rays 253 and 254 travel within the optical combiner assembly 220 from raster areas 178 and 179, respectively, to exit plane 246 a total optical path equivalent to four times the unitary path length "d". Therefore, the observer's eye 247 sees respective virtual images of blue raster areas 178 and 179 at the plane 248 located an equivalent optical distance of four times "d" along optical axis 245 from exit plane 246. Furthermore, due to the described reflections of blue light, the observer's eye sees respective virtual images of blue raster areas 178 and 179 as upright and disposed in conventional left-to-right orientation similar to that of the virtual images of raster areas 178 and 179, respectively.

Accordingly, with the optical combiner assembly 220 shown in FIG. 2, the observer's eye 247 sees all four virtual images of the raster areas 176-179 at the plane 248 as similarly oriented and superimposed on one another. As a result, the observer's eye 247 sees at the plane 248 a single multi-color image, such as the image 260 shown in FIG. 8, for example. Thus, the single combined image 260 produced by the optical combiner assembly 220 shown in FIG. 2 also has an entirely red R portion 262, an entirely green G portion 264 and an entirely blue B portion 266. The red R portion 262 of image 260 corresponds to the entirely red R portion 204 of raster area 176; and the green G portion 264 of image 260 corresponds to the entirely green G portion 208 of raster area 177. Moreover, the blue B portion 266 of image 260 corresponds to the entirely blue B portions 212 and 216 of raster areas 178 and 179, respectively.

Furthermore, the single combined image 260 produced by the optical combiner assembly 220 shown in FIG. 2 also has a yellow Y portion 268, a purple P portion 270, and a white W portion 272. The yellow Y portion 268 of image 260 corresponds to the combination and blending of red component portion 205 of raster area 176 and the green component portion 209 of raster area 177. The purple P portion 270 of image 260 corresponds to the combination and blending of the red component portion 207 of raster area 176 and the blue component portions 213 and 217 of raster areas 178 and 179, respectively. Also, the white W portion 272 of image 260 corresponds to the combination and blending of the red component portion 206 of raster area 176, the green component portion 210 of raster area 177, and the blue component portions 214 and 218 of raster areas 178 and 179, respectively.

Figure 11:
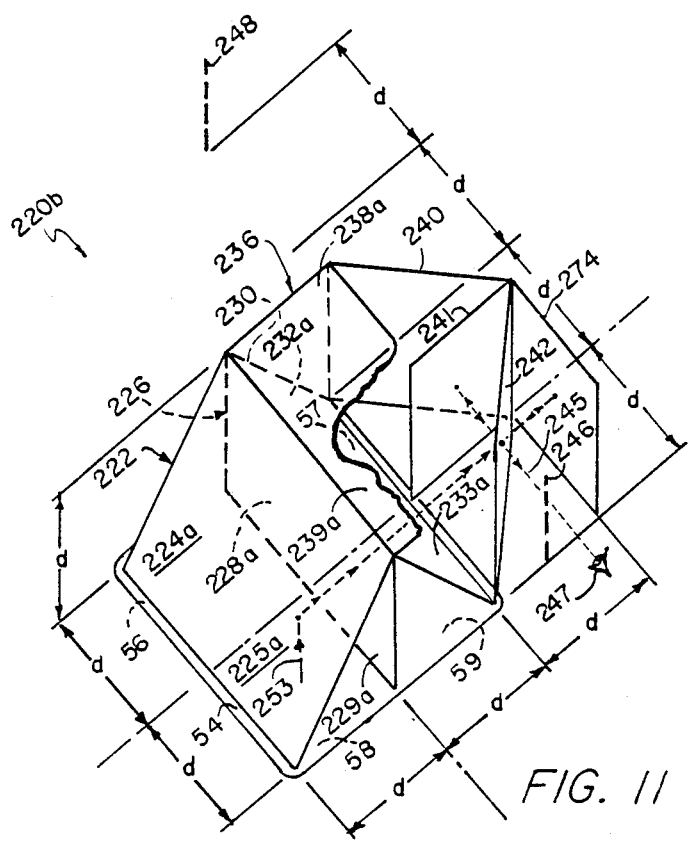
FIG. 11 is another alternative embodiment of the optical combiner assembly shown in FIG. 2 and illustrating the optical path of blue light emanating from a third quadrant portion of the output screen.

In FIG. 11, there is shown an another alternative embodiment 220b which is structurally similar to the alternative embodiment 220a shown in FIGS. 4-7 and, in addition, is provided with a blue light recovery mirror 274. The mirror 274 is disposed beyond the beamsplitter 242 and substantially parallel with the optical axis 245 for receiving the portions of blue light rays 253 and 254, respectively, which are transmitted through the beamsplitter 242, as shown in FIGS. 6 and 7. These portions of blue light rays 253 and 254 transmitted through beamsplitter 242, which were described as lost to the system in connection with optical combiner assembly 220a, are substantially all reflected back by the recovery mirror 274 to the beamsplitter 242. Consequently, at the beamsplitter 242, the blue light reflected by recovery mirror 274 is partly transmitted through the beamsplitter 242 to the beamsplitter half-portion 233a and partly reflected by the beamsplitter 242 in the direction of optical axis 245. As a result, this portion of blue light reflected in the direction of optical axis 245 passes through the exit plane 246 to the observer's eye 247.

Accordingly, the blue light reflected by the mirror 274 and beamsplitter 242 to the eye 247 travels from the respective raster areas 178 and 179 to the exit plane 246 a total optical path equivalent to four times the unitary path length "d". Therefore, the observer's eye 247 sees virtual images of blue raster areas 178 and 179 produced by this blue light at the plane 248 located an equivalent optical distance of four times "d" along optical axis 245 from the exit plane 246. Furthermore, due to the reflections of blue light from the mirror 274 and beamsplitter 242, as described, the associated virtual images of raster areas 178 and 179 seen at the plane 248 are oriented similar to the virtual images thereof produced by the blue light reflected by beamsplitter 242 and filter 241. As a result, the virtual images of raster areas 178 and 179 produced by blue light reflected from the mirror 274 and beam-splitter 242 appear superimposed on and enhance the virtual images produced by the blue light reflected by beamsplitter 242 and filter 241. Consequently, with the use of the optical combiner assembly 220b shown in FIG. 11, the observer's eye 247 is enabled to see a single multi-color image, such as the image 260 shown in FIG. 8, for example.

Thus, there has been disclosed herein an image display system having means for producing a group of three or more component images of a subject, each of which extends symmetrically from a central portion of the group and which is inverted in at least one aspect relative to the other component images of the group. The disclosed image display system also includes means coupled to the group for combining said three or more component images and producing a single combined image of said subject. Thus, if the three or more component images are in respective different colors, the resulting single combined image comprises a multi-color image of said subject.

Although the cathode ray type of image display tube 22 disclosed herein is shown as having a rectangular output faceplate, it may equally well be provided with an output faceplate having a circular configuration or any other suitable configuration desired. Also, although the faceplate 54 is shown as flat, it may equally well have a curvature which is symmetrical relative to the four quadrants, in which case the composite virtual image would have identical curvature. Also, although the beam deflection assembly 80 shown herein is of the raster scanning type, it may equally well be of the stroke-writing type having means for producing the outlines of desired alphanumeric characters, vector and other patterns anywhere on each of the respective quadrants 56–59 without scanning the entire quadrant. Moreover, although the respective switch devices 142–145 and 186–189 of the composite raster generator circuit shown in FIG. 9 are described as being of the mechanically operated type, such as relay switches, for example, they may equally well be of the electronically operated type, such as DG201 solid state switching devices sold by Analog Devices of Norwood, Mass., for example.

Although the mirrors and beamsplitters in the respective optical combiner assemblies 220, 220a and 220b have been described as being of the plate-like type, each of the mirrors and beamsplitters alternatively may comprise an appropriately coated surface of a right-angle prism. Furthermore, the optical devices in the respective optical combiner assemblies 220, 220a and 220b may be held in place with respect to one another and the output faceplate 54 by filling interposed spaced with an optically clear, index-matching cement, such as epoxy resin material used for bonding implosion panels to output faceplates of image display tubes, for example, to form a rigid assembly. Moreover, each of the beamsplitters in the respective optical combiner assemblies 220, 220a and 220b may be of the improved plate-like type disclosed in copending patent application Ser. No. 513,939 on July 15, 1983, filed by the present applicant and assigned to the same assignee.

Also, the respective quadrant portions 56, 57, 58 and 59 need not be made of the respective phosphor materials specified for producing the associated color light but may be made of other respective phosphor materials for producing the same or other desired color light. Moreover, the system 20 described herein would perform essentially as described, although somewhat less efficiently, if the phosphor screen 60 were comprised of a uniform intimate mixture of phosphor materials emissive in the four color lights described and if each of the mirrors and beamsplitters were more appropriately designed for reflecting and/or transmitting the particular color light desired.

In addition, the respective optical combiner assemblies 220, 220a and 220b would function as described if the single display tube 22 were replaced by four image display tubes having their output screens made of respective materials suitable for emitting associated distinctive color light and arranged approximately coplanar in close-spaced juxtaposed relationship. With four separate tubes, each supplied with its own deflection means, the phosphor screens thereof could be addressed simultaneously by respective electron beams, as in the well-known manner of multi-color flying spot scanning used in the television broadcasting industry, for example. Also, the described display system would function satisfactorily if other image producing means, such as matrix-addressed light emitting diode arrays, for example, were substituted for the image display tube 22 shown in FIG. 1.

From the foregoing, it will be apparent that all of the objectives of this invention may be achieved by matter shown and described herein. It also will be apparent, however, that various changes may be made by those skilled in the art without departing from the spirit of the invention as expressed in the appended claims. It is to be understood, therefore, that all matter shown and described herein is to be interpreted as illustrative and not in a limiting sense.

What is claimed is:

1. An imaging system comprising:
    means for producing a plurality of images and directing said images from said producing means along respective paths, each of said images being inverted in at least one aspect relative to the others of said images, a first one of said images being directed along a first one of said paths; and
    optical means coupled to said producing means and disposed in said respective paths for combining said images, said optical means including
    first reflective means extending substantially along said first one of said paths and disposed in spaced alignment with a portion of said first one of said paths for receiving therefrom a reflected image and reflecting said reflected image back towards said portion of said first one of said paths;
    second reflective means extending transversely from said first one of said paths and disposed in spaced alignment with said portion of said first one of said paths for receiving therefrom a transmitted image and reflecting said transmitted image back towards said portion of said first one of said paths; and
    image splitting and recombining means disposed in said portion of said first one of said paths for splitting said first one of said images into said reflected image and said transmitted image, for directing said reflected image and said transmitted image towards said first and reflective means, respectively and for recombining said reflected image and said transmitted image reflected back towards said portion of said first one of said paths by said first and second reflective means, respectively.

2. An imaging system as set forth in claim 1 wherein said plurality of images are disposed on a common surface and grouped about a point on the surface.

3. An imaging system as set forth in claim 2 wherein said surface is comprised of quadrant portions having respective corners disposed in a contiguous relationship at said point on said surface.

4. An imaging system as set forth in claim 3 wherein said plurality of images is comprised of at least three images and each of said images is disposed on a respective quadrant portion of said surface.

5. An imaging system as set forth in claim 1 wherein each one of said images comprises a component image of a subject.

6. An imaging system as set forth in claim 5 wherein each one of said component images is a different color.

7. An image display system comprising:
    means for producing a group of at least three component images of a subject and directing said images from said producing means along respective paths, each of said images being inverted in at least one aspect relative to the others of said images, a first one of said component images being directed along a first one of said paths; and optical means coupled to said image producing means and disposed in said respective paths for combining said images and forming a composite image of said subject, said optical means including first reflective means extending substantially parallel to said first one of said paths and disposed in spaced alignment with a portion of said first one of said paths for receiving therefrom a reflected image and reflecting said reflected image back towards said portion of said first one of said paths;

second reflective means extending substantially orthogonally to said first one of said paths and disposed in spaced alignment with said portion of said first one of said paths for receiving therefrom a transmitted image and reflecting said transmitted image back towards said portion of said first one of said paths; and image splitting and recombining means disposed in said portion of said first one of said paths for splitting said first one of said component images into said reflected image and said transmitted image, for directing said reflected image and said transmitted image towards said first and second reflective means, respectively, and for recombining said reflected image and said transmitted image reflected back towards said portion of said first one of said paths by said first and second reflective means, respectively.

8. An image display system as set forth in claim 7 wherein said image producing means includes means for producing each of said component images in a different color.

9. An image display system as set forth in claim 7 wherein said image producing means includes means for producing said component images on a common surface, said images being disposed in respective quadrant portions of the surface.

10. An image display system as set forth in claim 9 wherein a first one of said images in a first one of said quadrant portions is oriented in conventional left-to-right and top-to-bottom aspects, a second one of said images in a second one of said quadrant portions is oriented inversely relative to said left-to-right aspect of said first one of said images, and a third one of said images in a third one of said quadrant portions is oriented inversely relative to said top-to-bottom aspect of said first one of said images.

11. An image display system as set forth in claim 10 wherein said first one of said images and said second one of said images have corresponding portions of said subject disposed as mirror images of one another.

12. An image display system as set forth in claim 10 wherein said first one of said images and said third one of said images have corresponding portions of said subject disposed as vertically inverted duplicates of one another.

13. An image display system as set forth in claim 10 wherein a fourth one of said images in a fourth one of said quadrant portions is oriented inversely relative to both said left-to-right aspect and said top-to-bottom aspect of said first one of said images.

14. An image display system as set forth in claim 13 wherein said second one of said images and said fourth one of said images have corresponding portions of said subject disposed as vertically inverted duplicates of one another.

15. An image display system as set forth in claim 13 wherein said third one of said images and said fourth one of said images have corresponding portions of said subject disposed as mirror images of one another.

16. An image display system comprising:

imaging screen means including a phosphor layer having three quadrant portions made of phosphor materials different from one another for emitting respective different color light rays;

image producing means coupled to said imaging screen means for exciting emission of said respective different color light rays from said three quadrant portions and producing on said three quadrant portions respective color component images of a subject, each of said color component images being inverted in at least one aspect relative to the others of said images, with a first one said color component images being directed outwardly from said imaging screen means along a first path; and image combiner means coupled to said imaging screen means for combining said color component images and forming a single multi-color image of said subject, the image combiner means including first reflective means extending substantially parallel to said first path and disposed in spaced alignment with a portion of said first path for receiving therefrom a reflected image and reflecting said reflected image back towards said portion of said first path;

second reflective means extending transversely from said first path and disposed in spaced alignment with said portion of said first path for receiving therefrom a transmitted image and reflecting said transmitted image back towards said portion of said first path; and image splitting and recombining means disposed in said portion of said first path and oriented relative to said path at an angle greater than zero degrees for splitting said first color component image into said reflected image and said transmitted image, for directing said reflected image and said transmitted image towards said first and second reflective means, respectively and for recombining said reflected image and said transmitted image reflected back towards said portion of said first path by said first and second reflective means, respectively.

17. An image display system as set forth in claim 16 wherein said phosphor layer also has a fourth quadrant portion which is made of a phosphor material similar to the phosphor material of one of said three quadrant portions for emitting color light rays similar to the color light rays emitted by said one of said three quadrant portions.

18. An image display system as set forth in claim 16 wherein said image producing means includes quadrant portion scanning means for scanning each of said three quadrant portions in a manner inverse in at least one aspect relative to the manner of scanning the others of said three quadrant portions.

19. An image display system as set forth in claim 16 wherein said image combiner means includes optical means for directing said color component images of said subject from said three quadrant portions along respective paths of equal optical lengths to an output of the image combiner means.

20. An image display system as set forth in claim 19 wherein said optical means produces said single multi-color image of said subject as a virtual image in a plane located at an optical distance substantially equal to the length of said paths of equal optical lengths from said output of the image combiner means.

* * * * *